United States Patent
Kozlov et al.

(10) Patent No.: US 6,229,479 B1
(45) Date of Patent: *May 8, 2001

(54) RELATIVE POSITION MEASURING TECHNIQUES USING BOTH GPS AND GLONASS CARRIER PHASE MEASUREMENTS

(75) Inventors: Dmitry Kozlov; Alexander Povaliaev; Lev Rapoport; Stanislav Sila-Novitsky; Vladimir Yefriemov, all of Moscow (RU)

(73) Assignee: Magellan Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/291,583

(22) Filed: Apr. 13, 1999

Related U.S. Application Data

(63) Continuation of application No. 08/846,023, filed on Apr. 25, 1997, now Pat. No. 5,914,685.

(51) Int. Cl.[7] .................................................. G01S 5/02
(52) U.S. Cl. ............................... 342/357.06; 701/215
(58) Field of Search ..................... 342/357.06; 701/215

(56) References Cited

U.S. PATENT DOCUMENTS

| | | |
|---|---|---|
| 5,134,407 | 7/1992 | Lorenz et al. . |
| 5,194,871 | 3/1993 | Counselmann, III . |
| 5,293,170 | 3/1994 | Lorenz et al. . |
| 5,296,861 | 3/1994 | Knight . |
| 5,359,332 | 10/1994 | Allison et al. . |
| 5,442,363 | 8/1995 | Remandi . |
| 5,486,834 | 1/1996 | Lennen . |
| 5,519,620 | 5/1996 | Talbot et al. . |
| 5,557,524 | 9/1996 | Maki . |
| 5,606,736 | 2/1997 | Hasler et al. . |
| 5,621,416 | 4/1997 | Lennen . |
| 5,724,046 | 3/1998 | Martin et al. . |
| 5,739,785 | 4/1998 | Allison et al. . |
| 5,914,685 | * 6/1999 | Kozlov et al. ....................... 342/357 |
| 5,923,287 | 7/1999 | Lennen . |

OTHER PUBLICATIONS

Ashkenazi, V. et al. (1985) "GPS Interferometric Phase Algorithms" *Proceedings of the First International Symposium on Precise Positioning with the Global Positioning System* 1:299–313.

Hui, P. et al. (1982) "On Satellite Signal Processing Techniques Applicable to GPS Geodetic Equipment" *The Canadian Surveyor* 36(1):43–55.

Moskvin, G. et al. (1990) "Navigational Aspects of GLONASS" *GPS World* 1(1):50–54.

Penzin, K. (1990) "Real–Time Multiscale Measurement Maximum–Likelihood Processing Algorithms" *Scripta Technica* pp. 109–117.

(List continued on next page.)

*Primary Examiner*—Mark Hellner
(74) *Attorney, Agent, or Firm*—Coudert Brothers

(57) ABSTRACT

A technique of accurately determining the relative position of two points using carrier phase information from receivers capable of making code and carrier phase measurements on the L1 and L2 frequencies of signals from either or both GPS and GLONASS satellites. These signals are processed by a receiving system to determine relative position, for the purpose of surveying or otherwise, with the accuracy of carrier phase measurements being obtained. Signal processing similar to that used in existing GPS carrier phase based relative positioning receivers is used with GLONASS signals as well, with a modification that takes into account the unique and different frequencies of the signals from individual GLONASS satellites. Surface acoustic wave ("SAW") filters are also employed in an intermediate frequency receiver section in order to avoid imparting different delays to the GLONASS signals of different frequencies.

70 Claims, 9 Drawing Sheets

OTHER PUBLICATIONS

Povalyayev A.A., "Calculation of Quality Characteristics and Synthesis of Multiscale Measuring Devices Which Generate Maximum Likelihood Estimates" Simultaneous English translation of the Journal of Communication Technology and Electronic ISSN 1064–2269., pp. 39–45, vol. 23, No. 1, 1978.

Counselman et al., "Miniature Interferometer Terminals for Earth Surveying: Ambiguity and Multipath with Global Positioning System", IEEE Transactions on Geoscience and Remote Sensing, GE–19, pp. 244–252, 1981.

Counselman et al., "Centimeter–Level Relative Positioning with GPS", Journal of Surveying Engineering, vol. 109, No. 2, Aug. 1983.

Bock et al., "Geodetic Accuracy of the Macrometer Model V–1000", Bulletin Geoesique, vol. 58, No. 2, 1985.

Bock et al., "Establishment of a Three–Dimensional Geodetic Positioning System", Journal of Geophysical Research, vol. 90, No. B9, pp. 7689–7703, 1985.

Bock et al., Interferometric Analysis of GPS Phase Observations, Manuscripta Geodaetica, vol. 11, No. 4, pp. 282–288, 1986.

Abbot et al., "GPS Orbit Determination: Bootstrapping to Resolve Carrier Phase Ambiguity", Proceedings of the Fifth International Geodetic Symposium on Satellite Positioning, pp. 224–233, Las Cruces, New Mexico Mar. 13–17, 1989.

Hoffman et al., "GPS: Theory and Practice", Springer–Verlag, 1984, Third Edition, 355 pages.

"Interface Control Document GPS (200)", dated 1993, a revised version of a document first published in 1983.

"Global Satellite Navigation System Glonass", Interface Control Document of the RTCA, Paper No. 518–91/SC159–317, Nov. 14, 1995.

Lennen, "The USSR's Glonass P–Code—Determination and Initial Results", Proceedings of The Institute of Navigation—GPS, Sep. 27–29, 1989, Colorado Springs, Colorado.

MacDoran et al., "Codeless GPS Systems for Positioning of Offshore Platforms and #D Seismic Surveys," *Navigation*, vol. 31, No. 2 (1984) pp. 57–69.

Leick, "GPS Satellite Surveying," Wiley and Sons, pp. 209–213.

Gourevitch et al., "The GG24 Combined GPS+GLONASS Receiver", Proceedings of The Institute of Navigation—GPS, Sep. 17–20, 1996, Kansas City, Missouri.

Neumann et al., Test Results from a New 2 cm Real Time Kinematic GPS Positioning System, Proceedings of The Institute of Navigation—GPS, Sep. 17–20, 1996, Kansas City, Missouri.

Walsh et al., "GPS and GLONASS Carrier Phase Ambiguity resolution" Proceedings of The Institute of Navigation—GPS, Sep.17–20, 1996, Kansas City, Missouri.

Landau et al., "Carrier Phase Ambiguity Resolution using GPS and GLONASS Signals", Proceedings of The Institute of Navigation—GPS, Sep. 17–20, 1996, Kansas City, Missouri.

Gourevitch et al., "Ashtech RTZ, Real Time Kinematic GPS with OTF Initialization", Proceedings of The Institute of Navigation—GPS, Sep. 12–15, 1995, Palm Springs, California.

Povalyayev A.A., "On Maximum Likelihood Estimates in a Multiple–Scale Measuring Device", Simultaneous English translation of the Journal of Communication Technology and Electronic ISSN 1064–2269., pp. 96, vol. 21, No. 5, 1976.

Eastwood, "An Integrated GPS/GLONASS Receiver", The Institute of Navigation, Proceedings of the National Technical Meeting, San Diego, Jan. 23–25, 1990, pp. 37–43.

Raby et al., "A Dual Navstar GPS/GLONASS Satellite Receiver", The Institute of Navigation, Proceedings of ION GPS—90, Sep. 19–21, 1990, pp. 549–554.

Hojo et al., "An Integrated GPS/GLONASS Receiver", The Institute of Navigation, Proceedings of the ION GPS—93, Sep. 22–24, 1993, pp. 979–984.

Shebshayevich, "Main Problems of Joint Use of GLONASS and NAVSTAR in differential Navigation Fixing" Proceedings of the First International Symposium on Real Time Differential Applications of the Global Positioning System, TUV Rheinland, Koln, vol. 1: 81–85.

Povalyaev Alexander, "Processing of Carrier Phase Measurements in GLONASS Navigational System as a Basis of High–Precision Determination of user's Relative Coordinates", Proceedings of the Moscow Institute of Radioelectronics and Automatics (MIReA), 1993.

Povalyaev Alexander, "High–Precision Determination of Relative Coordinates by Carrier Phase of Satellite Radio–Navigational Systems", Scientific & Technical Conference with International Participation, Krasnoyarsk, Russia, Sep. 16–18, 1992.

Rossbach et al. "Treatment of Integer Ambiguities in DGPS/DGLONASS Double Difference Carrier Phase Solutions", Proceedings of the 9th International Techincal Meeting of the Satellite Division of the Institute of Navigation, ION GPS—96, Sep. 17–20, 1996, pp. 909–916.

Teunissen et al., "The Volume of the GPS Ambiguity Search Space and its Relevance for Integer Ambiguity Resolution", Proceedings of the 9th International Techincal Meeting of the Satellite Division of the Institute of Navigation, ION GPS—96, Sep. 17–20, 1996, pp. 889–898.

Van Diggelen, Frank, "The Ashtech GG Family of Products", Proceedings of the 9th International Techincal Meeting of the Satellite Division of the Institute of Navigation, ION GPS—96, Sep. 17–20, 1996, pp. 131–140.

Landau et al., Carrier Phase Ambiguity Resolution using GPS and GLONASS Signals, Proceedings of the 9th International Techincal Meeting of the Satellite Division of the Institute of Navigation, ION GPS—96, Sep. 17–20, 1996, pp. 917–923.

Leick et al., "Processing GLONASS Carrier Phase Observations—Theory and First Experience", Proceedings of the 8th International Technical Meeting of the Stellite Division of the Institute of Navigation, ION GPS—95, Sep. 12–15, 1995, pp. 1041–1047.

Bogdanov et al., "Marine Radiobeacon DGPS/DGLONASS Service and Regional Centers for Differential GLONASS/Alpha Chayka Services", Proceedings of the 8th International Technical Meeting on the Stellite Division of the Institute of Navigation, ION GPS—95, Sep. 12–15, 1995, pp. 1013–1020.

Riley et al., "A Combined GPS/GLONASS High Precision Receiver for Space Applications", Proceedings of the 8th International Technical Meeting of the Stellite Division of the Institute of Navigation, ION GPS—95, Sep. 12–15, 1995, pp. 835–844.

Niklasch et al., "Kalman Filter Procedures for GPS/GLONASS–Signals", Proceedings of the 8th International Technical Meeting of the Stellite Division of the Institute of Navigation, ION GPS—95, Sep. 12–15, 1995, pp. 1061–1068.

Leisten, Olover, "Compact Circuitry for GLONASS Reception", Proceedings of the 7th International Technical Meeting of the Stellite Division of the Institute of Navigation, ION GPS—94, Sep. 20–23, 1994, pp. 453–459.

Balendra et al., "Fully Integrated GLONASS Dual Frequency P–Code and GPS/GLONASS Single Frequency C/A Code Receiver: Features and Performance", Proceedings of the 7th International Technical Meeting of the Stellite Division of the Institute of Navigation, ION GPS—94, Sep. 20–23, 1994, pp. 461–470.

Walsh et al., "GPS and GLONASS Carrier Phase Ambiguity Resollution", Proceedings of the 9th International Technical Meeting of the Stellite Division of the Institute of Navigation, ION GPS—96, Sep. 17–20, 1996, pp. 899–907.

Raby et al., "Integrated GPS/GLONASS Navigation: Algorithms and Results", Int. J. Satell. Commun., vol. 12, No. 5., Sep.–Oct. 1994, pp. 443–451.

Brodin et al., "GNSS code and carrier tracking in the presence of Multipath", International Journal of Satellit Communications, vol.15, No.1 pp. 25–34.

Dubinko, "A Total Hardware Based GPS/GLONASS Receiver", The 2nd International Conference on Satellite Communications Proceedings vol. III, Sep. 23–27, 1996, p. 248.

Felhauer et al., "Impact of Multipath Signal Reception on Signal tracking in Spread Spectrum Satellite Navigation Receivers", IEEE Fourth International Sysmposium on Spread Spectrum Techniques & Applications, Sep. 22–25, 1996, pp. 862–866.

McCullagh et al., "RF IC's for GPS Applications", Colloquium on RF & Microwave Circuits for Commercial Wireless Applications, Feb. 13, 1997, pp. 1/1–1/6.

Beser, Jacques, "Integrated GPS/GLONASS User Equipment", AGARD Lecture Series 207, Jun. 1996, pp. 3–1 thru 3–27.

Salishchev et al., "Station for Monitoring GLONASS and GPS Radionavigation Fields and Determining Differential Corrections", Radio and Communications Technology, Vo. 1, No. 1, pp. 114–119, 1996.

Kinkul'kin I.E., "Radionavigation Systems' Equipment: Integrated Equipment for Users of Satellite Radionavigation Systmes", Radio and Communications Technology, Vo. 1, No. 1, pp. 110–113, 1996.

Matjaz, Vidmar, "A DIY Receiver for GPS and GLONASS Satellites: Part–3", VHF Communications, vol. 26, 1994, pp. 151–164.

Matjaz, Vidmar, "A DIY Receiver for GPS and GLONASS Satellites: Part–2", VHF Communications, vol. 26, 1994, pp. 66–77.

Matjaz, Vidmar, "A DIY Receiver for GPS and GLONASS Satellites: Part–3b", VHF Communications, vol. 26, 1994, pp. 197–200.

Matjaz, Vidmar, "A DIY Receiver for GPS and GLONASS Satellites: Part–4", VHF Communications, vol. 27, 1995, pp. 35–51.

Matjaz, Vidmar, "A DIY Receiver for GPS and GLONASS Satellites: Part–5", VHF Communications, vol. 27, 1995, pp. 78–90.

Matjaz, Vidmar, "A DIY Receiver for GPS and GLONASS Satellites: Part–6", VHF Communications, vol. 27, 1995, pp. 153–167.

Matjaz, Vidmar, "A DIY Receiver for GPS and GLONASS Satellites: Part–7", VHF Communications, vol. 27, 1995, pp. 194–205.

Riley et al, "Performance of the GLONASS P–Code at L1 and L2 Frequencies", International Journal of Satellite Communications, vol. 12, 453–462, 1994.

Daly et al., GNSS—progress towards implementation, IEEE Position Location and Navigation Symposium, Apr. 11–15, 1994, pp. 23–30.

Hojo et al., "GPS/GLONASS Integrated Receiver", JRC Review, No. 33, pp. 3–8.

Chamberlain, Steven M., "Combined GPS/GLONASS Navigation", National Telesystems Conference Proceedings, Mar. 26–27, 1991, 205–210.

Leisten et al., "Design and Performance of a Miniature GPS/GLONASS Receiver", Microwave Engineering Europe, Apr. 13, 1992, pp. 33–38.

Riley, Stuart, "An Integrated Multichannel GPS/GLONASS Receiver", The Institute of Navigation, Proceedings of the ION GPS—92, Sep. 16–18, 1992, pp. 463–471.

Ordonez et al., "First Experiences with Differential GLONASS/GPS Positioning", The Institute of Navigation, Proceedings of the ION GPS—92, Sep. 16–18, 1992, pp. 153–158.

* cited by examiner

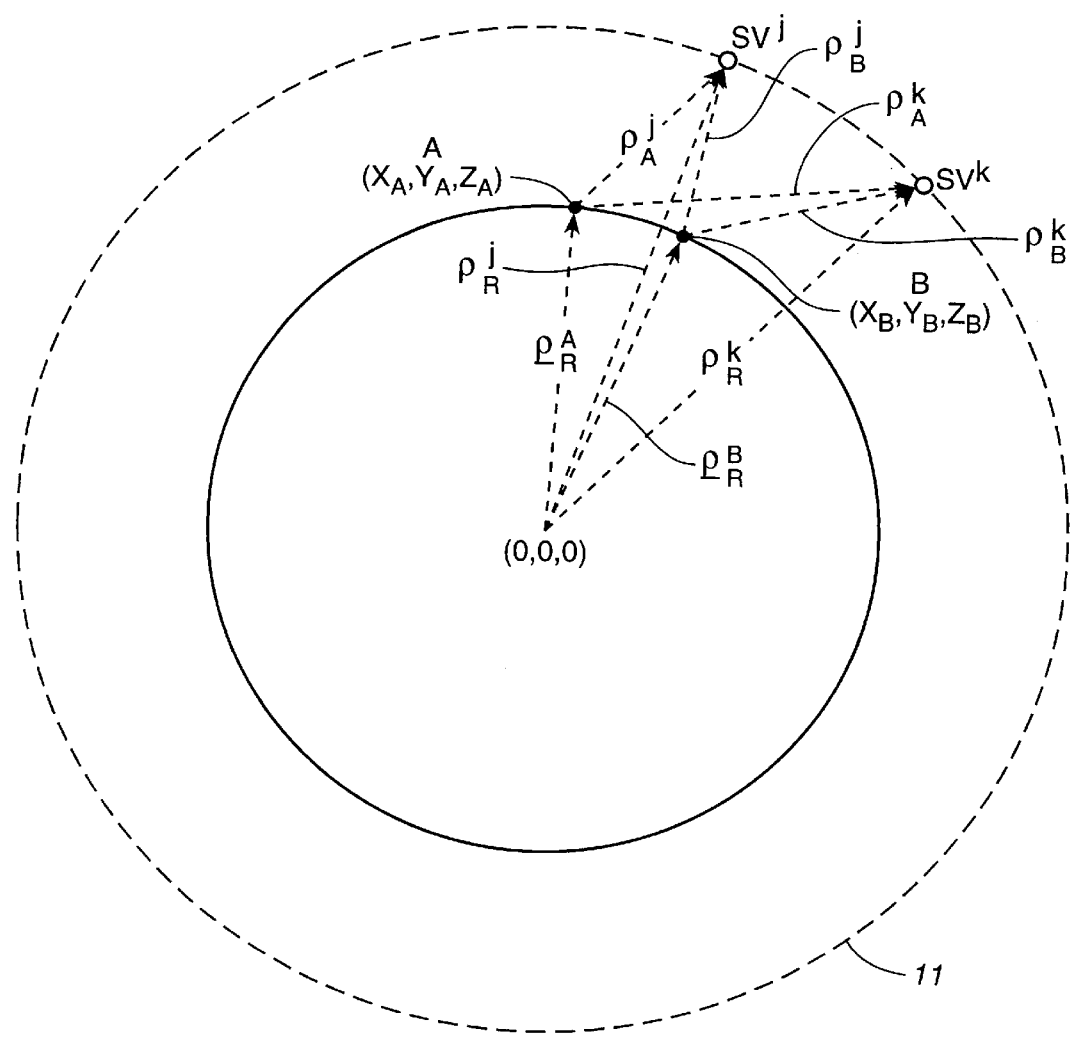
FIG._1

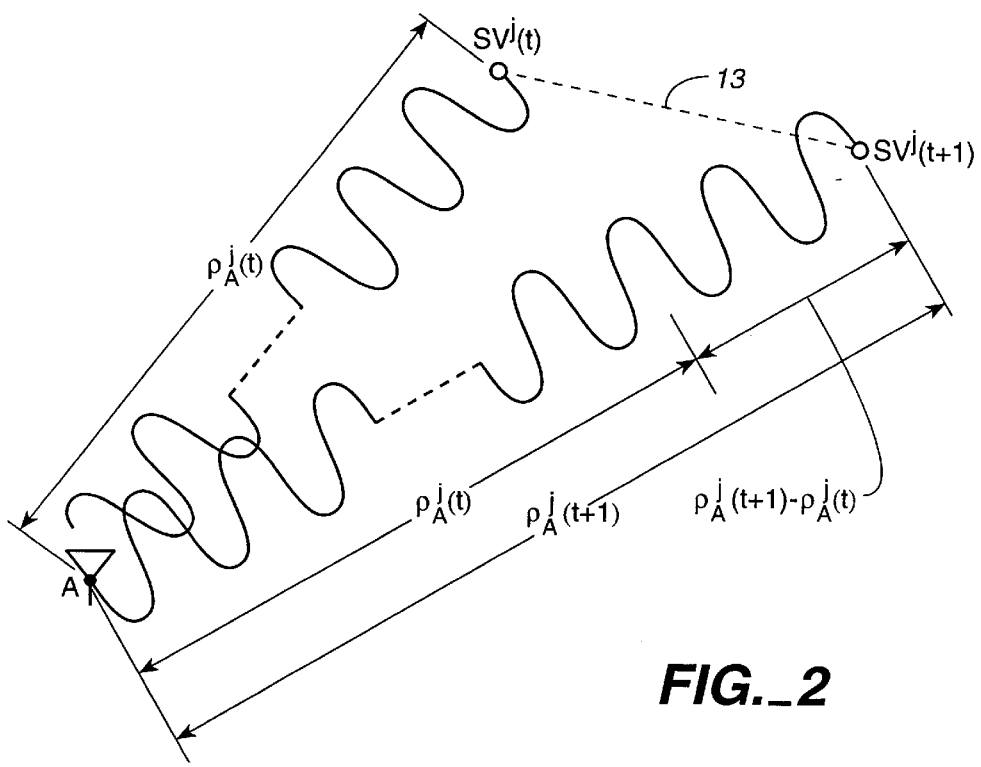
FIG._2
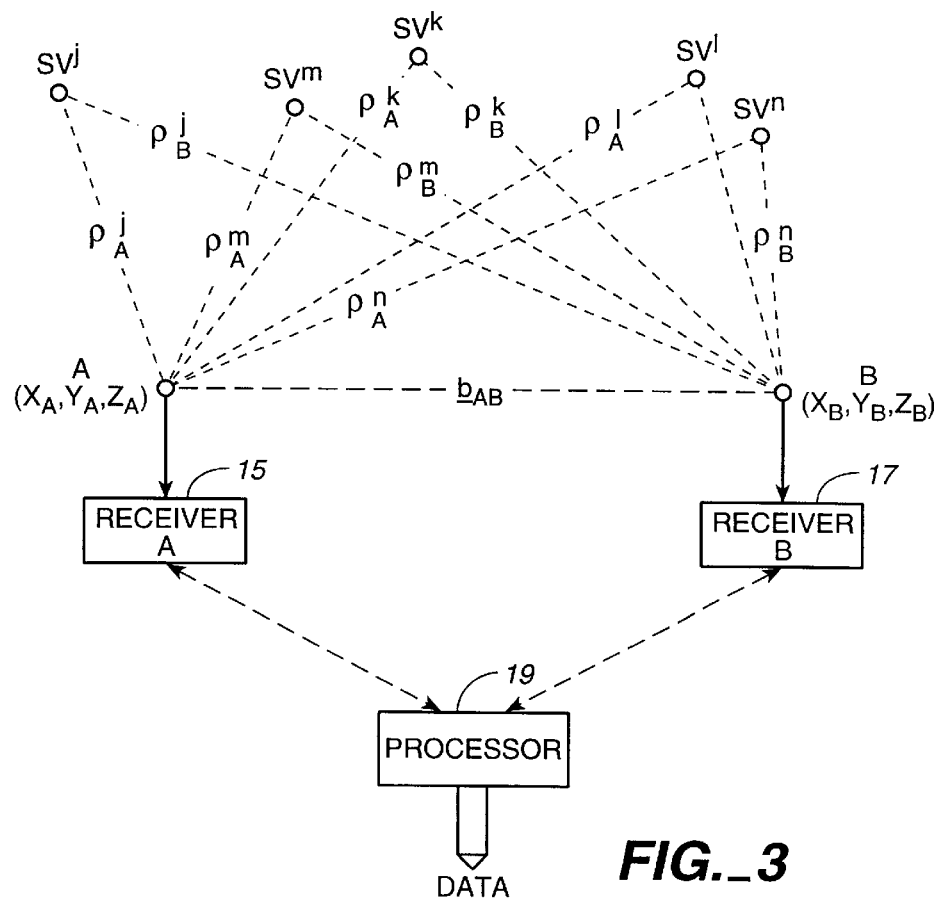
FIG._3

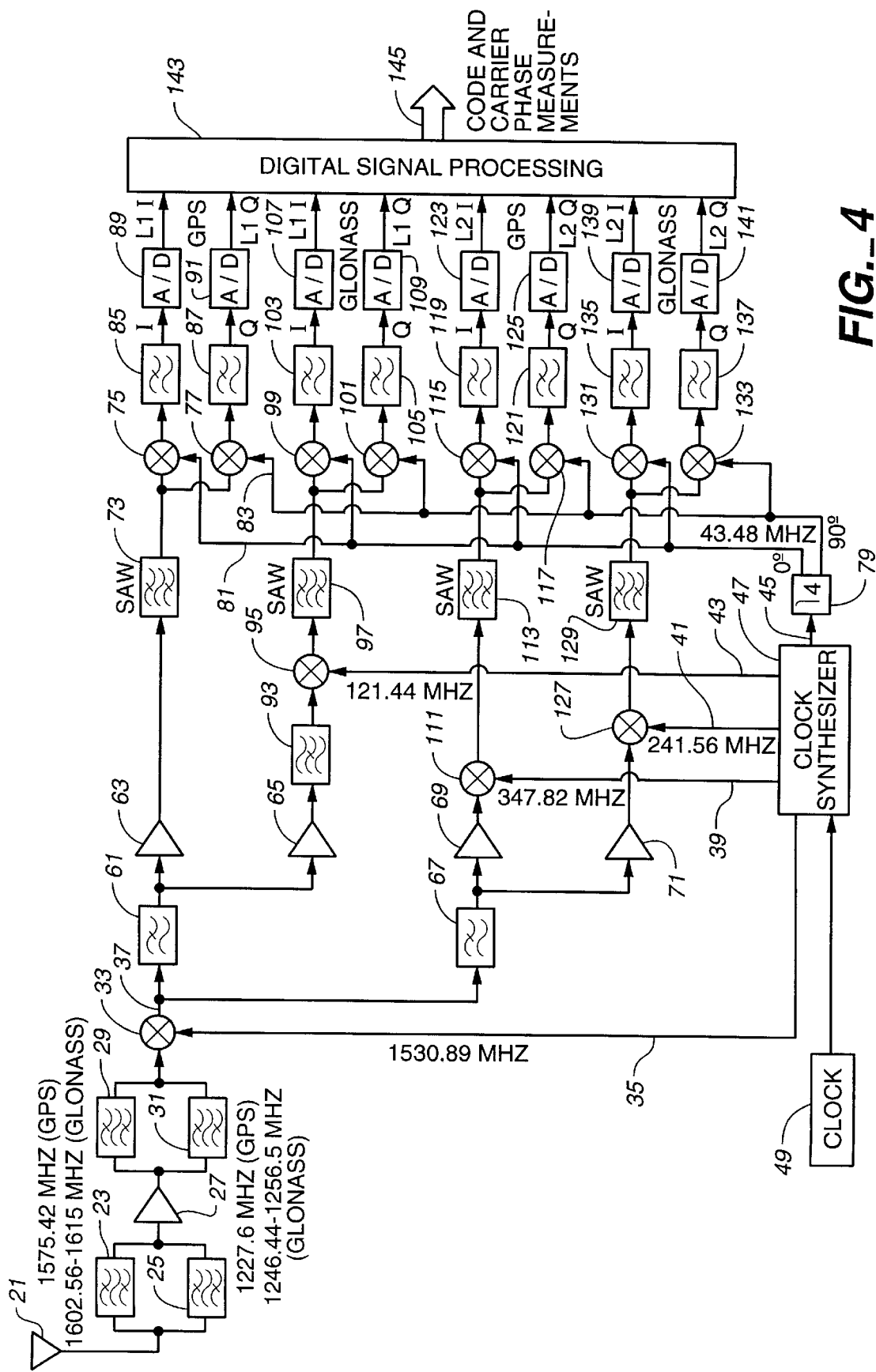
FIG._4

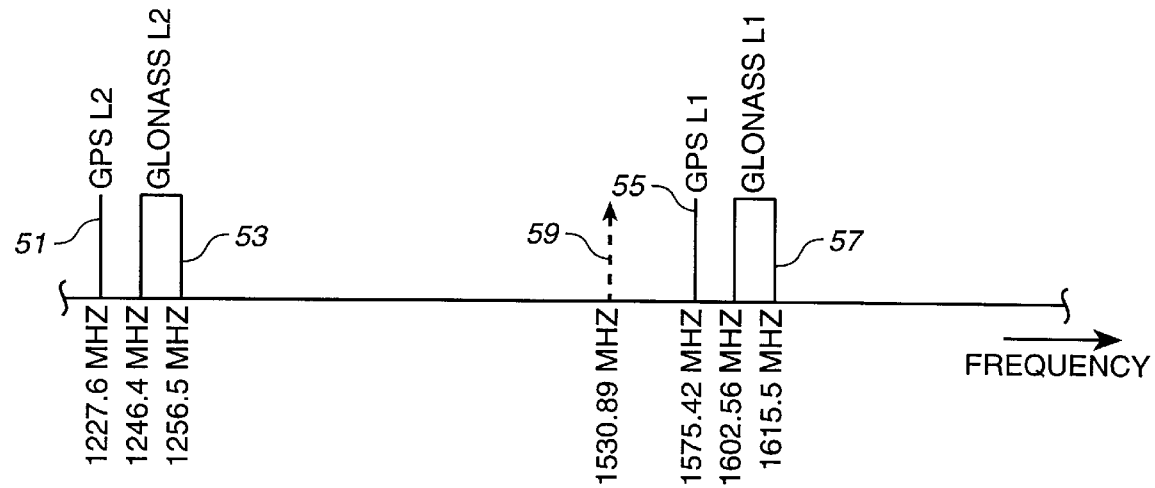
FIG._5
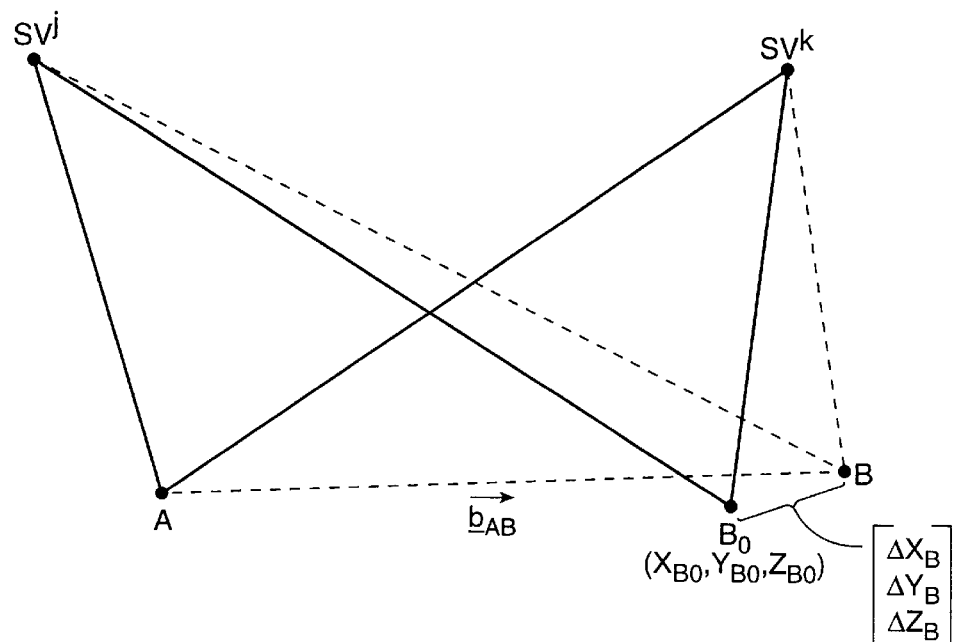
FIG._6

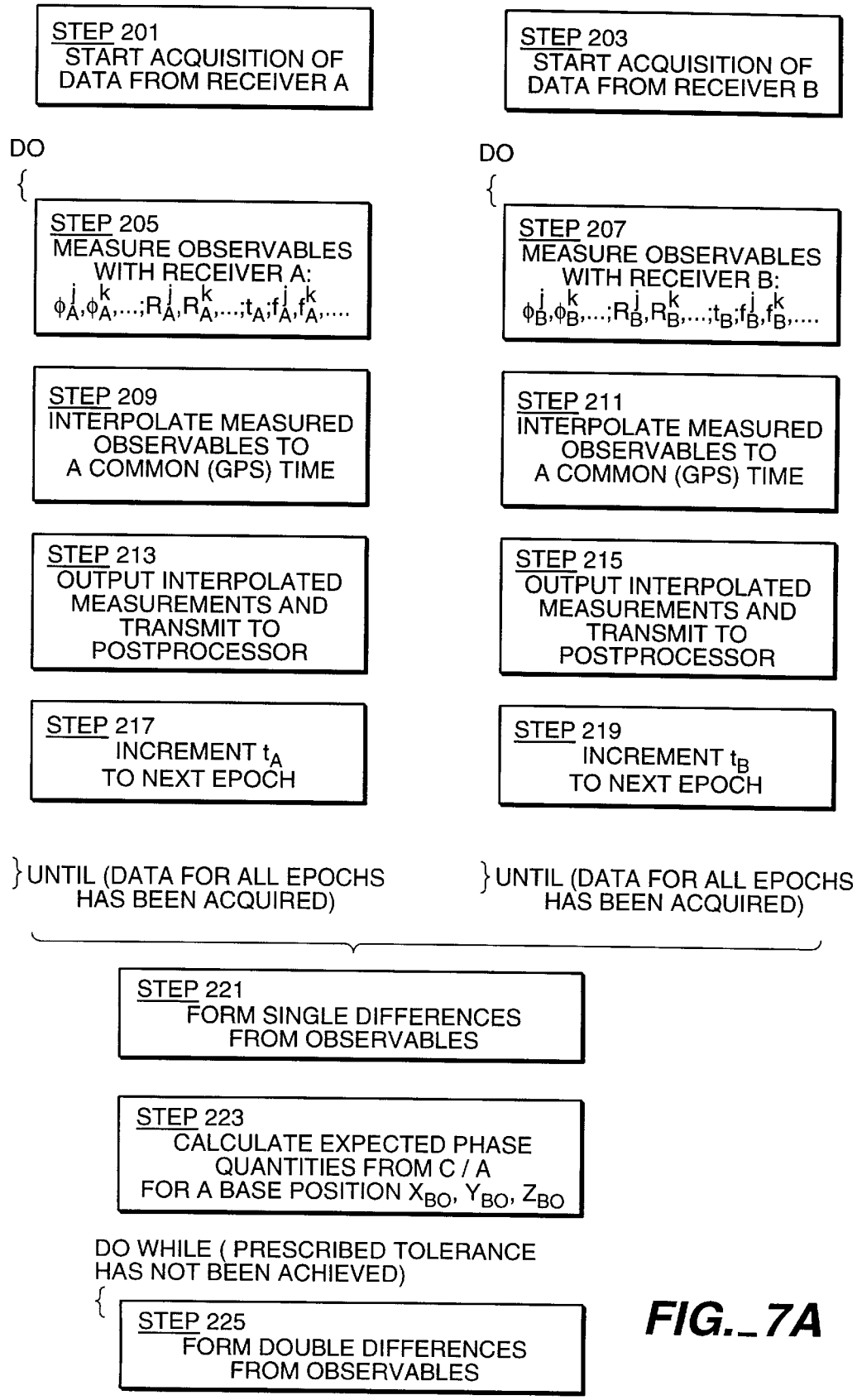
FIG._7A

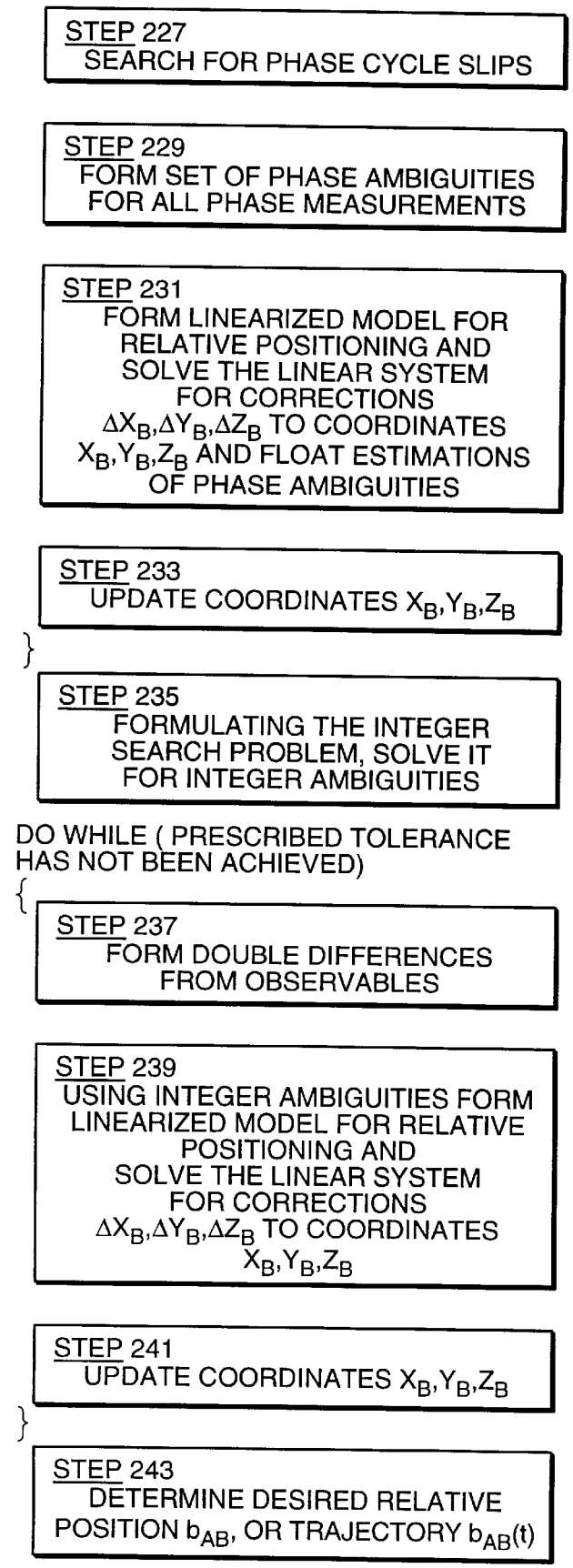
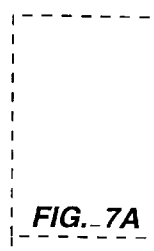
FIG. 7B
FIG. 7A
FIG. 7B
FIG. 7

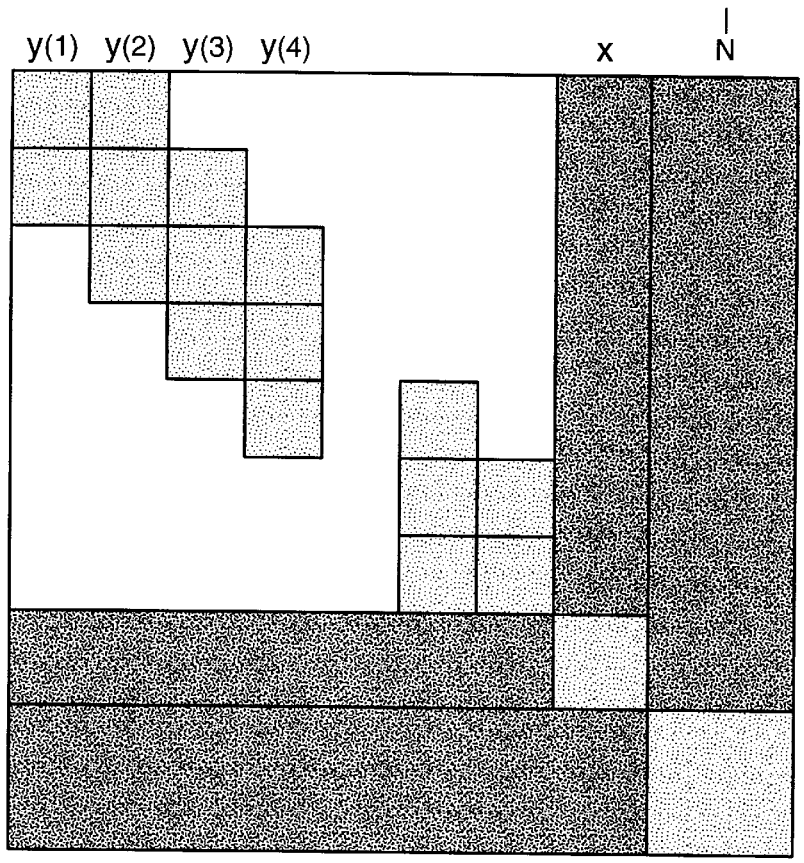
*FIG._8*
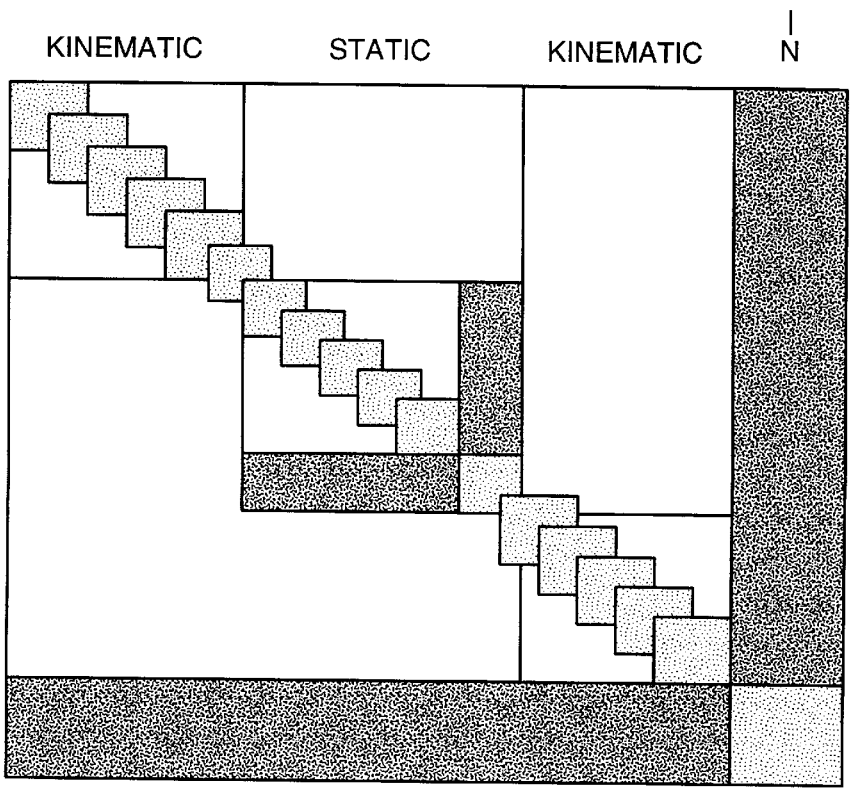
*FIG._10*

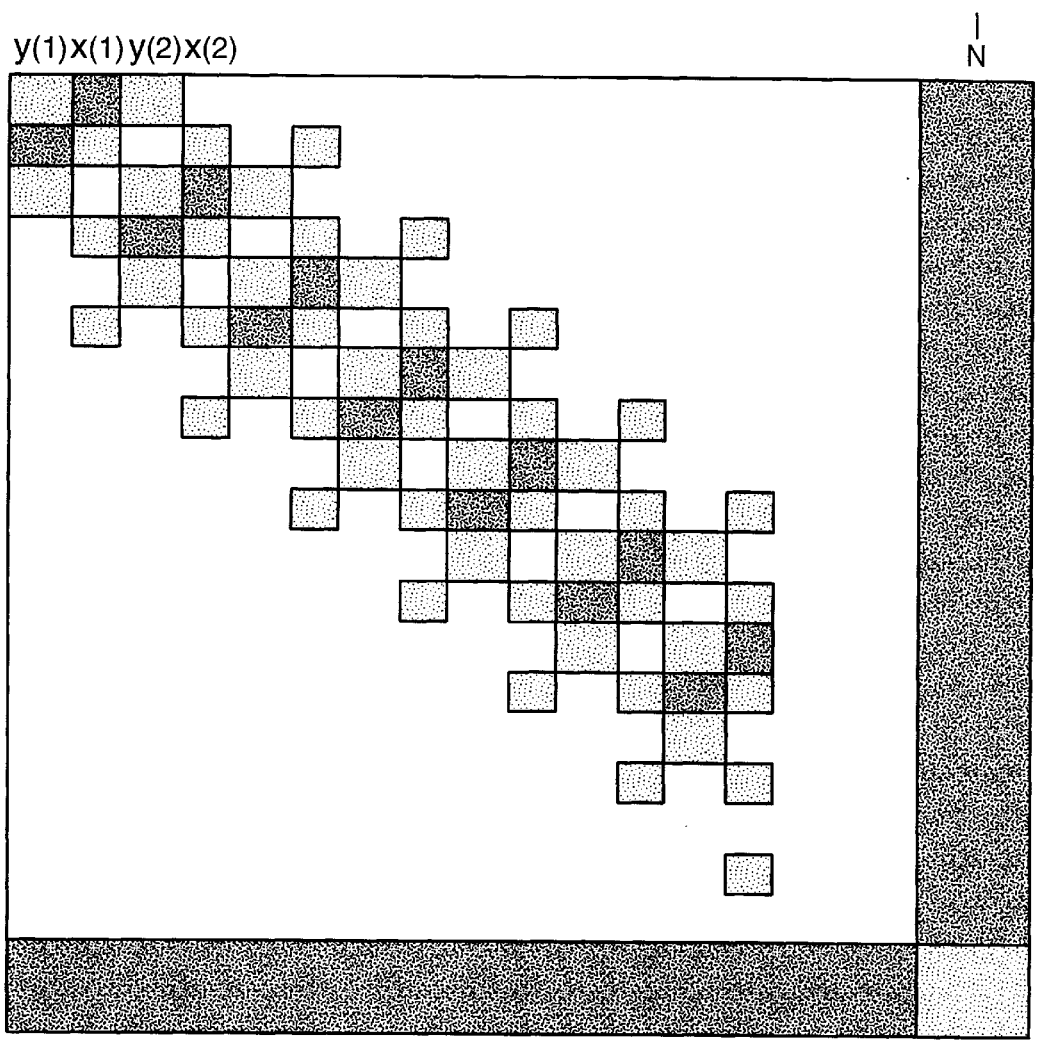
FIG._9

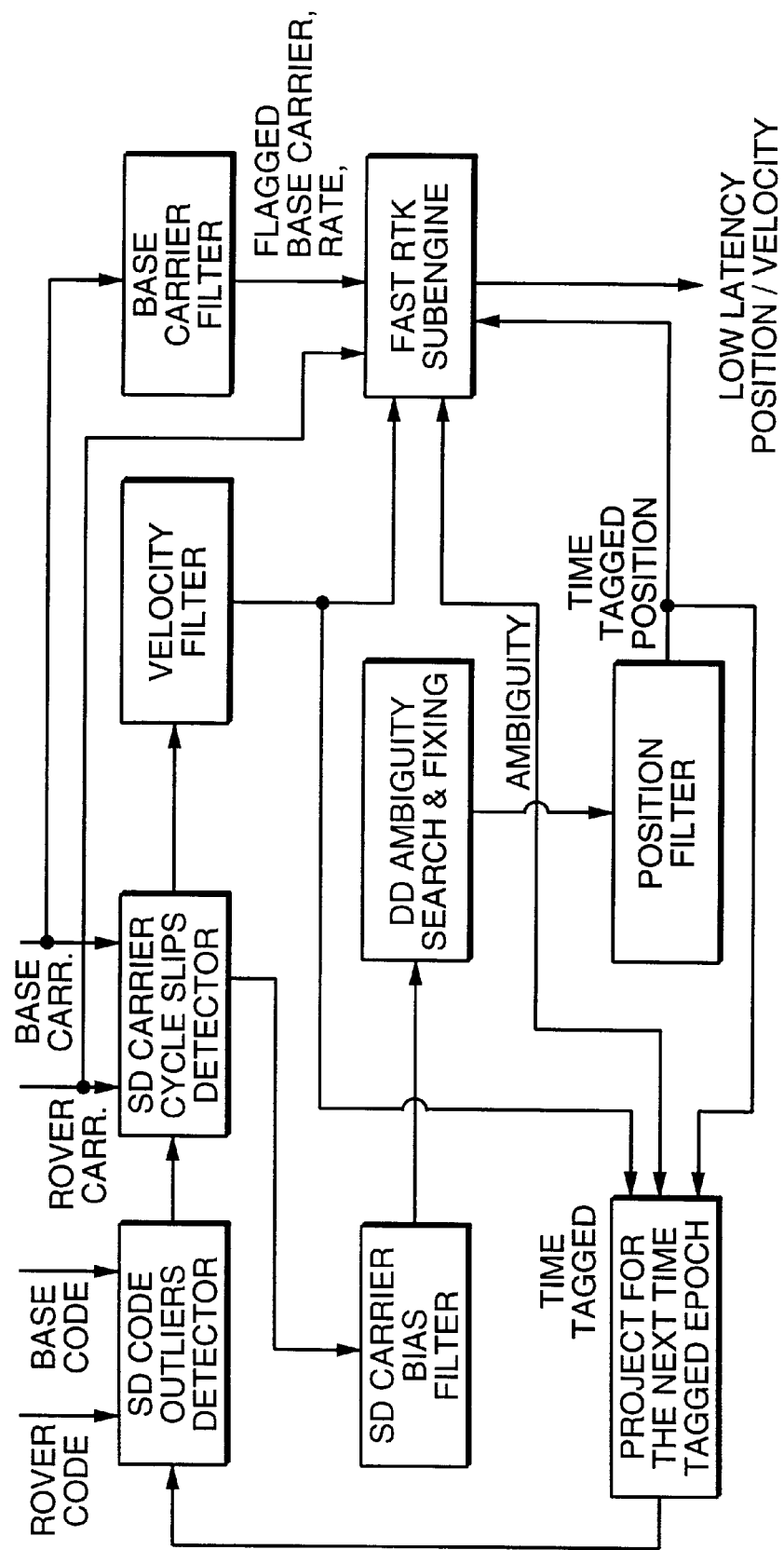
FIG._11

RELATIVE POSITION MEASURING TECHNIQUES USING BOTH GPS AND GLONASS CARRIER PHASE MEASUREMENTS

This is a continuation of application Ser. No. 08/846,023, filed Apr. 25, 1997. Now U.S. Pat. No. 5,914,685.

BACKGROUND OF THE INVENTION

The present invention relates generally to a method and system for determining the relative positions between two or more locations, such as survey marks, using radio signals broadcast by the Global Positioning System ("GPS") satellites of the United States and the Global Satellite Navigation System ("GLONASS") satellites of the former USSR, and more particularly to improved methods of signal processing and instrumentation for determining these positions.

There are many GPS and GLONASS applications being implemented, both military and commercial. An appropriate receiver in an aircraft, ship, tractor, automobile, or the like, allows a user to determine position and/or velocity. Another application is surveying to accurately determine the location of a point or a distance between two or more points. It is this last application to which the present invention most closely pertains.

As is well known, GPS was established by the United States government, and employs a constellation of satellites in orbit around the earth at an altitude of approximately 26500 km. Currently, the GPS constellation consists of 24 satellites, arranged with 4 satellites in each of 6 orbital planes. Each orbital plane is inclined to the earth's equator by an angle of approximately 55 degrees.

Each GPS satellite transmits microwave L-band radio signals continuously in two frequency bands, centered at 1575.42 MHz and 1227.6 MHz., denoted as L1 and L2 respectively. The GPS L1 signal is quadri-phase modulated by a coarse/acquisition code ("C/A code") and a precision ranging code ("P-code"). The L2 signal is binary phase shift key ("BPSK") modulated by the P-code. The GPS C/A code is a gold code that is specific to each satellite, and has a symbol rate of 1.023 MHz. The unique content of each satellite's C/A code is used to identify the source of a received signal. The P-code is also specific to each satellite and has a symbol rate of 10.23 MHz. The GPS satellite transmission standards are set forth in detail by the Interface Control Document GPS (200), dated 1993, a revised version of a document first published in 1983.

GLONASS was established by the former Soviet Union and operated by the Russian Space Forces. The GLONASS constellation consists of 24 satellites arranged with 8 satellites in each of 3 orbital planes. Each orbital plane is inclined to the earth's equator by an angle of approximately 64.8 degrees. The altitude of the GLONASS satellites is approximately 19100 km.

The satellites of the GLONASS radio navigation system transmit signals in the frequency band near 1602 MHz, and signals in a secondary band near 1246 MHz, denoted as L1 and L2 respectively. The GLONASS L1 signal is quadri-phase modulated by a C/A code and a P-code. The L2 signal is BPSK modulated by the P-code. Unlike GPS, in which all of the satellites transmit on the same nominal frequency, the GLONASS satellites each transmit at a unique frequency in order to differentiate between the satellites. The GLONASS L1 carrier frequency is equal to 1602 MHz+k * 0.5625 MHz, where k is a number related to the satellite number. The GLONASS L2 carrier frequency is equal to 1246 MHz+k * 0.5625 MHz. The GLONASS C/A code consists of a length 511 linear maximal sequence. Details of the GLONASS signals may be found in the Global Satellite Navigation System GLONASS-Interface Control Document of the RTCA Paper No. 518-91/SC159-317, approved by the Glavkosmos Institute of Space Device Engineering, the official former USSR GLONASS responsible organization.

Although no carriers are present in the transmitted GPS and GLONASS signals, the carriers may be said to be implicit therein. The term "carrier" refers to a component having an effectively constant amplitude and phase. Because the GPS and GLONASS signals are modulated by pseudo-random codes, on average, the band center frequency carrier is suppressed. The term "carrier" is used herein refers to the dominant spectral component after the modulation is removed.

The carrier is reconstructed in a GPS or a GLONASS receiver by one of a number of techniques. The most straight forward technique is to multiply the received signal with a locally generated estimate of the modulation contained on the received signal. The P-code of GPS satellites, however, is usually encrypted, the encrypted precision ranging code being termed a "Y-code". The purpose of encrypting the P-code is to prevent "spoofing," which is the possibility of a hostile force emulating a GPS satellite signal to cause military airplanes, ships and the like to be misdirected and calculate incorrect values of velocity, position, time and the like. There are, however, methods utilized to recover the carrier from the encrypted signals and provide an estimate the P-code without decryption being necessary, such as the methods described in U.S. Pat. No. 5,134,407, Lorenz et al., that are useful for surveying and other commercial applications.

None of the GLONASS signals are encrypted but the P-code has not been officially published. However, the GLONASS P-code has been determined to be derived from a length 2**25-1 linear maximal sequence. [Lennen, Gary R., "The USSR's GLONASS P-Code Determination and Initial Results", ION GPS-89, Colorado Springs, Sep. 27–29, 1989]. The inventors have verified the results of Lennen and have found them to be correct. There has been no assurance that this code will not be changed in the future.

There are many factors that affect the accuracy of measurements made through either GPS or GLONASS. The path of travel, or ephemeris, of each satellite is elliptical and subject to being altered by solar winds and other natural causes. Since the accuracy of any measurement is dependent upon knowledge of the position of the involved satellites at any given time, an estimate of the path of travel is calculated on earth for each of the satellites and periodically uploaded into it. The estimated position of each satellite is then part of the data that is transmitted as part of its signals that are used by a receiver on earth. Other causes of inaccuracies include variable effects of the ionosphere and troposphere on propagation of signals from the satellites to the receivers.

The accuracy of the GPS system is also intentionally degraded in order to limit its usefulness to users not authorized by the United States military. The intentional degradation is introduced through controlled variation of the satellite clocks and ephemeris data. The relative phases of signals transmitted by all the GPS satellites are periodically shifted by simultaneously dithering the internal clocks of the satellites. The resulting condition is generally referred to as Selective Availability ("SA"). The accuracy of GPS for the United States military is not affected, since military users are provided with cryptographic methods to remove the introduced satellite clock and ephemeris data errors. GLONASS has no such intentional accuracy degradation. When using GPS to determine the relative position between two stations, the SA induced errors are common to both stations and approximately cancel.

The use of GPS in commercial applications, such as surveying, is quite valuable and rapidly increasing. Since the GPS satellite positions are known, a point on earth may be geometrically determined by simultaneously measuring the range from that point to three satellites. This is, basically, a standard trilateration technique. The range to each of the three satellites can be viewed as the radius of a spherical surface having the satellite at its center. The point of intersection of all three spherical surfaces is the point whose position is being determined. In GPS, the positions of the satellites and locations on earth are expressed as vectors in a coordinate system with an (x,y,z) position of (0,0,0) located at the center of the earth.

The range from a receiver to a satellite is determined by measuring, in effect, the time that it takes for the signal to traverse from the satellite to the receiver, with knowledge of the position of the satellite. Each of the satellites have internal clocks that are synchronized to a single GPS time. The receiver has a clock which is not, in general, synchronized to GPS time. Thus, the ranges to four or more satellites are simultaneously measured in order to be able to solve for four unknowns, namely the three spatial coordinates of the receiver location and an offset of the receiver clock time from the GPS time.

Some GPS receivers use the C/A code carried by the L1 signal, providing range measurements that are not particularly precise (typically about one meter) because of the relatively low repetition rate of the C/A code. This technique is used in inexpensive position receivers, where the accuracy provided by this technique is quite adequate. These receivers lock onto the C/A code by correlating the received signals with an internally generated replica of the C/A code. Other receivers use the P-code, which increases the accuracy because of the higher repetition rate, but requires that the P-code be known or estimated so that it can be generated within the receiver in order to be correlated with the incoming signal. The most accurate results are obtained, however, by receivers that use the carrier signal reconstructed from the satellite signals for making range measurements. The present invention makes use of the reconstructed carrier to make accurate relative position measurements.

Techniques for determining the relative positions of two spaced apart points using GPS are well known. In the usual GPS receiver signal processing technique, the range to a satellite is expressed in terms of an integer N, which represents a number of whole cycles of the carrier between the earth location and the satellite, as adjusted by terms representing a fractional portion of a carrier cycle (a phase term $\phi$) and offsets of the receiver and satellite clocks from true GPS time (a clock bias $\delta$). A given measurement includes acquiring signals from multiple satellites at the same time (during a first epoch t) in order to produce data from which multiple equations with multiple variables may be solved for the desired ranges. Signals are usually again acquired during a second epoch (t+1), and others, in order to improve the signal-to-noise ratio of the received signal. In applications where the distance between two points is being measured, the application with which the present invention specifically pertains, well known GPS signal processing techniques exist.

Several papers discuss the use of GPS and GLONASS carrier phase relative positioning, as follows:

1) "The GG24 Combined GPS+GLONASS Receiver", S. Gourevitch, S. Sila-Novitsky, F. van Diggelen, Proceedings of ION-GPS '96, September 17–20, Kansas City, Mo.

2) "Test Results from a New 2 cm Real Time Kinematic GPS Positioning System", J. B. Neumann, A. Manz, T. J. Ford, O. Mulyk, Proceedings of ION-GPS '96, September 17–20, Kansas City, Mo.

3) "GPS and GLONASS Carrier Phase Ambiguity Resolution", D. Walsh, P. Daly, Proceedings of ION-GPS '96, September 17–20, Kansas City, Mo.

4) "Carrier Phase Ambiguity Resolution using GPS and GLONASS signals", H. Landau, U.Vollath, Proceedings of ION-GPS '96, September 17–20, Kansas City, Mo.

5) "Ashtech RTZ, Real-Time Kinematic GPS with OTF Initialization", S. Gourevitch, F. van Diggelen, X. Qin, M. Kuhl, Proceedings of ION-GPS '95, September 12–15, Palm Spring, Calif.

Several papers discuss the theory of ambiguity resolution, as follows:

6) "On Maximum Likelihood Estimate in Multi-Scale Measurement Device", A. Povalyaev, Raditekhnika i Electronika, v.21, No.5, 1976. Simultaneous English translation of the Journal of Communication Technology and Electronic ISSN 1064–2269.

7) Calculation of Quality Characteristics and Synthesis of Multiscale Measuring Devices Which Generate Maximum Likelihood Estimates, A. Povalyaev, Raditekhnika i Electronika, v.23, No.1, 1978. Simultaneous English translation of the Journal of Communication Technology and Electronic ISSN 1064–2269.

Several early papers discuss range measuring techniques and theory, as follows:

8) Counselman and Gourevitch, "Miniature Interferometer Terminals for Earth Surveying: Ambiguity and Multipath with Global Positioning System," *IEEE Transactions on Geoscience and Remote Sensing,* GE-19, pp. 244–252 (1981);

9) Counselman, Abbot, Gourevitch, King and Paradis, "Centimeter-Level Relative Positioning with GPS," *Journal of Surveying Engineering,"* 109, pp. 81–89 (1983);

10) Bock, Abbot, Counselman, Gourevitch, King and Paradis, "Geodetic Accuracy of the Macrometer Model V-1000," *Bulletin Geodesique,* 58, pp. 211–221 (1984);

11) Bock, Abbot, Counselman, Gourevitch and King, "Establishment of a Three-Dimensional Geodetic Control Network by Interferometry with the Global Positioning System, *Journal of Geophysical Research,* 90, B9, pp. 7689–7703 (1985);

12) Bock, Gourevitch, Counselman, King and Abbot, "Interferometric Analysis of GPS Phase Observations," *Man. Geod.,* 11, pp. 282–288 (1986); and 13) Abbot, Counselman, Gourevitch and Ladd, "GPS Orbit Determination: Bootstrapping to Resolve Carrier Phase Ambiguity," *Proc. Of the Fifth International Geodetic Symposium on Satellite Positioning,* Las Cruces, N. Mex. (Mar. 13–17, 1989).

A book by Hofmann-Wellenhof, Lichtenegger and Collins, *GPS Theory and Practice,* Third edition, Springer-Verlag, 1994, also discusses GPS relative position measurements. It is the mathematical notation in this book that is attempted to be followed herein. Section 8.2, entitled "Relative Positioning" at pages 183–197, and sections 9.1–9.3 of the Data Processing chapter, pages 199–244, are particularly pertinent to the present invention. This book is hereby incorporated into this Background by this reference.

Briefly, the processing of GPS signals for determining the location of two points along a baseline is accomplished by forming single differences of the range equations of the two points with respect to each of the satellites during a single epoch, combining ambiguity and clock bias terms N and δ, respectively, and then forming double difference equations from a difference between two single difference equations relating to two different satellites. In this combining, the clock bias terms drop out because the carrier frequencies of each of the GPS satellites are the same.

The use of GLONASS approximately doubles the number of available navigation space vehicles (SVs) compared to GPS only operation. There are also additional advantages for civilian users. It has already been proved that tracking both GPS and GLONASS signals yields substantially improved stand alone position accuracy [see reference 1, above], since GLONASS has no Selective Availability type of degradation. For code differential processing, combining GPS with GLONASS provides a significant benefit. One of the most significant aspects of any real-time kinematic processing which makes use of differential code and carrier data, is the speed and reliability of the on-the-fly ambiguity resolution, i.e., the ability of the processing to determine the integer number of unknown cycles present in the differential carrier measurement. The ability to resolve the integer ambiguities affords the user with centimeter level accuracy as well as a confidence in the accuracy of these measurements. With GPS-only, in order to get fast on-the-fly ambiguity resolution, there is a need to use the L2 frequency and hence expensive P code receivers [reference 2, above]. While for many applications it is desirable to track the L1 and L2 signals from GPS and GLONASS, in cost sensitive applications it may be of advantage to use only the L1 frequencies of GPS and GLONASS.

Combined GPS plus GLONASS differential processing involves more than adding extra GLONASS codes and carriers to standard GPS RTK engine. The main problems arise from the fact that GLONASS has different frequencies for different SVs. Some authors [references 3 and 4, above] report that inter-channel hardware biases may make ambiguity resolution for GLONASS impossible without preliminary receiver calibration. There are also some additional difficulties in such a process which will be discussed later.

The difference in frequencies of the individual GLONASS satellites precludes the use of the above summarized carrier phase processing technique. The terms of the equations which represent receiver clock biases do not automatically drop out as they do when processing GPS signals. As a result, GLONASS processing uses code phases, not carrier phases, and the results are not as accurate as with the GPS system.

Therefore, it is a primary object of the present invention to provide combined GPS plus GLONASS satellite receiver signal processing techniques that provide the same accuracy of relative positioning measurements as current GPS signal processing techniques but afford much improved capability to resolve integer ambiguities which results in accuracy as well as reliability of said solution.

It is another object of the present invention to provide such techniques that are useable without regard for whether an individual satellite signal being processed originates in a GPS or GLONASS satellite.

It is another object of the present invention to provide an improved satellite signal processing method and receiver apparatus for determining the relative positions of two points.

SUMMARY OF THE INVENTION

These and additional objects are accomplished by the present invention, wherein, briefly and generally, a signal receiving system utilizes signals from the carriers of either GPS or GLONASS satellites, or a combination of both, in order to determine the relative positions of two or more points (all being stationary, or one or more having some motion) with the accuracy of the GPS system described above. This effectively increases the number of satellites that can be used by a receiving system at a particular location, thus eliminating difficulties sometimes encountered when one or more GPS satellites is blocked from the view of a receiver by a hill, building or the like.

According to one aspect of the present invention, a common signal processing algorithm is used by the receiving system to process signals from both GPS and GLONASS satellites. The general processing technique, as summarized above and described in section 2 of the Appendix, is employed for processing static, kinematic, or a combination of static and kinematic data. According to another aspect of the present invention, a technique, optimized for real time kinematic processing using single differences is described in section 3 of the Appendix.

According to a more specific aspect of the present invention, the signal processing is performed in a manner such that the integer nature of unknown number of cycles up to the satellite is exploited. To fix ambiguities for combined GPS and GLONASS observations, one must use code observations; in the case of GPS only processing, this is not the case. The inventors have determined that the GPS and GLONASS pseudorange measurements are sufficiently accurate to permit said ambiguity resolution for GLONASS and GPS carrier measurements. It should be appreciated that the accuracy of this method is degraded by hardware offsets (biases) in the carrier phase measurements.

GLONASS signal processing is done in the same manner as the GPS only system but with the equations being modified to retain terms that include satellite frequency or wavelength since the signal frequencies of the individual GLONASS satellites are unique. Because a single satellite signal carrier frequency is not assumed, as it is with the normal GPS processing, the receiver clock offset terms fδ of the double difference equations do not cancel out. This presents another unknown in the equations to be resolved. The GPS double difference equations are preferably supplemented with additional equations that relate the receiver clock offsets with range by use of either the C/A code or P-code that is included in the signals. In order to take into account that GPS time and GLONASS time are not exactly the same, signals from five satellites, instead of the minimum of four satellites used with the GPS system, are usually simultaneously received and processed.

When using a combined GPS and GLONASS constellation for standalone positioning, a minimum of 5 Svs are generally needed to compute position. It should be appreciated that for differential positioning, four SVs (say, two GPS plus two GLONASS) may be sufficient to compute differential position. This may be achieved by computing the GPS-GLONASS time offset at one location and transmitting said difference to the other of the locations. Four SVs of a mixed constellation are generally not sufficient to fix integer ambiguities. Resolving said integer ambiguities may be possible if both receivers use optimized frequency plans which guarantee the initial phase of receiver heterodyne to be the same for GPS and GLONASS SVs.

According to another aspect of the present invention, a Surface Acoustic Wave ("SAW") type of bandpass filter is positioned in the path of baseband signals in each of four processing channels. This type of filter has the characteristic of a uniform and more importantly, repeatable group delay over the range of baseband frequencies of GLONASS satellite signals. The different frequency GLONASS satellite signals are then processed without a variable delay that other types of filters usually impart to signals having different frequencies. The combination of the use of stable, linear-phase filters, such as SAW filters, and the signal processing summarized above gives very precise relative positioning results from the use of GLONASS satellite signals.

Additional objects, features and advantages of the present invention will become apparent from the following description of its preferred embodiments, which description should be taken in conjunction with the accompanying drawings.

BRIEF DESCRIPTION OF THE DRAWINGS

FIG. 1 shows the symbols used for various distance quantities between two satellites and two receivers;

FIG. 2 illustrates conventions that identify distances that signals travel at different times from a moving satellite to a fixed point on earth;

FIG. 3 schematically shows a receiver system for making a differential position measurement from the signals of five satellites being received at two locations;

FIG. 4 is a block diagram of each of the receivers of FIG. 3;

FIG. 5 is a frequency spectrum of GPS and GLONASS satellite signals, and a local oscillator of the receiver of FIG. 4;

FIG. 6 is a diagram that illustrates linearized calculations made by the receivers of FIG. 3 as part of the algorithm illustrated in FIGS. 7a and 7b;

FIGS. 7a and 7b illustrates an algorithm for processing both GPS and GLONASS satellite signals in order to determine the relative positions of points A and B of FIG. 3;

FIG. 8 shows the pattern of the system matrix for static positioning with the ionosphere delays taken into account;

FIG. 9 shows the pattern of the system matrix for kinematic positioning with the ionosphere delays taken into account;

FIG. 10 shows the pattern of the system matrix for the most general case mixing static and kinematic positioning modes; and FIG. 11 is a block diagram that illustrates the operation of the real time kinematic processor.

DESCRIPTION OF THE PREFERRED EMBODIMENTS

Referring initially to FIG. 1, the coordinate system of the positioning satellite system is illustrated. Its center (0,0,0) is made to be coincident with the center of the earth. Only two satellites $SV^j$ and $SV^k$ are shown, for simplicity, and they are indicated to be traveling in the same orbit 11. The satellite orbits are actually elliptical in shape, being shown in FIG. 1 to be circular for ease in illustration. Receivers according to the present invention are positioned at points A (position $X_A$, $Y_A$, $Z_A$ of the satellite system) and B ($X_B$, $Y_B$, $Z_B$), which, in this example, are stationary locations on earth. It is the relative position of points A and B that is to be measured from the simultaneous receipt of signals from multiple satellites, usually four or five, or more. The satellites may both be GPS, both GLONASS, or one of each. Alternatively, the relative positions of three or more points may be determined, and one or more of them may be moving with respect to the others. The principles of the relative positioning techniques described herein are used in these alternative situations as well.

Data of the respective ranges $\rho_R^j$ and $\rho_R^j$ of the two satellites shown are transmitted on the respective satellite signals as a function of each satellite's internal clock. Data of the path of travel of each satellite is updated periodically, as often as once each hour, by transmissions from a ground station as a function of some common time, such as GPS time. The ranges $\rho_A^j$ and $\rho_A^k$ are measured from data acquired by the receiver A. The ranges $\rho_B^j$ and $\rho_B^k$ are measured from data acquired by the receiver B. This then allows the difference between position vectors $\rho_R^A$ and $\rho_R^B$ to be calculated, and thus also a relative position vector $\underline{b}_{AB}$ (FIG. 3) of the points A and B to be determined. It is the relative position vector $\underline{b}_{AB}$, the difference in location of the points ($X_A$, $Y_A$, $Z_A$) and ($X_B$, $Y_B$, $Z_B$) that is the final result.

It should be appreciated that the quantities such as pseudorange and carrier phase may be computed from measurements at a location that is other than the location of the receiver corresponding to said measurements.

Since the relative positions of the satellites with respect to the ground points A and B are constantly changing, the signal measurement is made at one instant of time (in one epoch). Additional measurements are generally made in subsequent epochs in order to obtain redundant information that is also processed in order to improve the signal-to-noise ratio of the resulting composite measurement. FIG. 2 illustrates the notation to indicate the position of the satellite $SV^j$ at one point in time t as $SV^j(t)$. At a subsequent time (t+1), after traveling over a path 13, that satellite is at the position $SV^j(t+1)$. Similarly, the range of that satellite from the point A at time t is $\rho_A^j(t)$, and at time (t+1) is $\rho_A^j(t+1)$.

Referring to FIG. 3, in order to measure the relative positions of points A and B, a receiver antenna is positioned at each of these points and connected to respective receivers 15 and 17. characteristics (observables) of each of the multiple satellite signals received by each of the receivers are measured. Data of those observables are then sent by each receiver to a post-processor 19, which is a general purpose computer that is programmed to rapidly calculate the relative position vector $\underline{b}_{AB}$ from these observables. The post processor 19 is usually placed in a location that is different from either of the receivers 15 or 17, with communication established between them by any one of several standard technologies. Alternatively, the post-processor 19 can be collocated with one of the receivers 15 or 17. In yet another embodiment, the post processor may be collocated with one of the receivers and the post-processing functions may be performed in near real-time. The communication link between the receivers 15 and 17 and the processor 19 is formed by any one of several appropriate data transmission techniques, such as by a radio link, a telephone data link, a dedicated data cable, and the like. In the illustration of FIG. 3, the signals from five satellites $SV^j$, $SV^k$, $SV^l$, $SV^m$, and $SV^n$, are shown to be utilized. They can all be GPS satellites, GLONASS satellites, or a combination thereof. The receivers 15 and 17, and the post-processor 19, process each satellite signal in the same way regardless of whether from a GPS or GLONASS satellite. It is possible under certain circumstances to use signals from only four satellites to determine the desired relative position value, and the signals from more than five can optionally be used.

The system of each of the receivers 15 and 17 is shown in FIG. 4. A signal from an antenna 21 passes through two bandpass filters 23 and 25 connected in parallel, is amplified by an amplifier 27, passes through two more bandpass filters 29 and 31 connected in parallel, and is applied to a mixer 33. The mixer 33 also receives a clock (local oscillator) signal in a circuit 35, resulting in sum and difference frequency bands being generated in an output 37 of the mixer 33. This oscillator signal, and others of different frequencies in circuits 39, 41, 43, and 45, are generated in a clock synthesizer circuit 47 in response to a receiver clock signal from an internal clock circuit 49.

The receiver of FIG. 4 receives and processes signals from both GPS and GLONASS satellites. One of each of the pairs of parallel filters 23, 25 and 29, 31 passes the L1 signal bands of each of the GPS and GLONASS satellites, while blocking other frequencies, and the other of each of the pairs of filters passes the L2 signal bands of each of the GPS and GLONASS satellites. FIG. 5 shows the spectral ranges of these various signals. The L2 signals of all the GPS satellites have a common frequency 51, while the L2 signals of the GLONASS satellites have different frequencies within a band 53. Similarly, the L1 signals of all the GPS satellites have a common frequency 55, while the L2 signals of the GLONASS satellites have different frequencies within a band 57. The frequency 59 of the clock signal in the circuit 35 is also indicated, being in between that of the L1 and L2 signals.

A low pass filter 61 passes a desired difference frequency signal from the mixer 33 to two amplifiers 63 and 65 that provide intermediate frequency L1 GPS and GLONASS signals. Another low pass filter 67 passes a desired difference frequency signal from the mixer 33 to two amplifiers 69 and 71 that provide intermediate frequency L2 GPS and GLONASS signals. The four desired intermediate frequency signal bands (those of the L1 GPS, L1 GLONASS, L2 GPS and L2 GLONASS signals) are then processed separately.

Signals having frequencies closely surrounding the intermediate L1 GPS frequency band are passed through a SAW bandpass filter 73. The filtered signal is applied to mixers 75 and 77 that also receives a clock signal from a Johnson counter 79 that provides respective zero and ninety degree relative phase versions of the same frequency clock in circuits 81 and 83. These two signals are passed through separate low pass filters 85 and 87, resulting in base band L1 GPS signals. These orthogonal phase versions of the L1 GPS signals are then digitized by inputting them to separate analog-to-digital ("A/D") converters 89 and 91. The outputs of the A/Ds 89 and 91 provide two digital signals representing the GPS L1 signals being received by the antenna 21.

An output of the amplifier 65 supplies a filter 93 whose output signal is shifted in frequency by a mixer 95 that also receives a clock signal in the circuit 43. The resulting intermediate frequency L1 GLONASS signals are then passed through a SAW filter, whose output is connected to mixers 99 and 101 that also receive the clock signals of circuits 81 and 83, respectively. The mixer outputs, base band L1 GLONASS signals, are passed though low pass filters 103 and 105, and then through A/Ds 107 and 109 to provide two digital signals representative of any L1 GLONASS signals being received.

The output of the amplifier 69 is shifted in frequency by a mixer 111 that also receives the clock signal in the circuit 39. The intermediate frequency L2 GPS signals in the mixer output are selected by a SAW bandpass filter 113. The filtered signals are then applied to mixers 115 and 117 that also receive the clock signals in the lines 81 and 83. The base band L2 GPS signal outputs of the mixers are individually low pass filtered by filters 119 and 121 and then input to respective A/Ds 123 and 125. The digital signal outputs of the A/Ds 123 and 125 represent the L2 GPS signals.

In a similar manner, an output of the amplifier 71 is shifted in frequency by a mixer 127 that receives a clock signal in the circuit 41. A SAW band pass filter 129 receives the intermediate frequency output of the mixer 127 and provides the filtered signal to mixers 131 and 133. These mixers also receive the clock signals in the lines 81 and 83. Their base band L2 GLONASS signal outputs are passed through low pass filters 135 and 137, respectively, and then connected with respective A/Ds 139 and 141. The outputs of these two A/Ds provide data of any L2 GLONASS signals being received.

Use of the SAW filters 97 and 129 in the GLONASS signal processing circuits of FIG. 4 has a significant advantage in the system being described. A SAW filter operates by the input signal launching an acoustic wave along a suitable substrate. It is selected for use in the receiver of FIG. 4 because of its characteristic of having a uniform phase delay for all frequencies within its pass band. Thus, this type of filter equally delays each of the different unique frequency signals of the individual GLONASS satellites that are passing through it. This is important since the receiver is measuring, among other things, carrier signal phase delay. The increased accuracy of distance measurements that results from the signal processing aspects of the present invention, to be described below, makes it highly desirable to provide equal phase delay of all the different frequency signals that are being processed.

The digital data outputs of all eight A/Ds are received by a digital signal processor ("DSP") 143 that determines from this data the desired code and carrier phase observables of the signals from the satellites that are being received. As is standard with GPS receivers, the processor 143 includes a number of separate parallel processing sections. Each section processes either a L1 or a L2 signal received from a single satellite. Two sections are therefore provided for each of the satellite signals that are expected to be received and processed at the same time, in this case five or more satellites. The results of this processing are made available as data 145 that are connected with the post-processor 19 (FIG. 3).

The steps involved in the signal processing by both the receivers and the post-processor are outlined in the flow chart of FIG. 7, with reference to the mathematical description given in sections 2 and 3 of an Appendix hereto. Section 1 of said Appendix describes the symbols and notation used in these developments. A step 201 indicates that the receiver 15 of the signals at point A is beginning acquisition of data from the satellite signals it is receiving. A step 203 indicates the same operation for the receiver 17 of satellite signals at point B.

The two receivers 15 and 17 next independently process the received signals at first times $t_A$ and $t_B$, respectively, to measure the desired observables, as indicated in steps 205 and 207. The processor 143 (FIG. 4) of each receiver uses a unique one of its parallel processing sections for signals from each of the five satellites j, k, l, m, n, and more if signals from additional satellites are being processed. The notations shown in steps 205 and 207 for the observables are defined in the first section of the Appendix for the satellite j, the same observables of other satellites being denoted by a superscript k, l, m or n instead of j. The subscript A denotes the observables being measured by the receiver of signals at the point A, and the subscript B denotes the observables being measured by the receiver of signals at the point B.

Steps 209 and 211 interpolate these measured observables to a common time in each of the respective receivers A and B. The results are then transferred to the post-processor by each of the receivers, as indicated by steps 213 and 215. This then completes the processing of the individual receivers for the data acquired at a single one of their respective epochs.

Since it is usually desirable to determine the same observables again for subsequent times (t+1), (t+2), etc., within a few seconds, the steps 217 and 219 increment to the next epoch, and the processing begins again with the respective steps 205 and 207. Once the observables for all the epochs have been acquired, the post-processor 19 then begins its calculations using the observables from both receivers.

A first post-processing step 221 forms "single differences" from these observables, details being provided by section 1 of the Appendix. The single phase difference calculation is routinely performed in GPS relative position measurements. But in this case, since post-processing needs to be able to deal with observables from GLONASS signals as well as GPS signals, the terms including frequency and wavelength of the received signals are carried in the equations. This allows use of a common relative positioning algorithm for processing observables from both GPS and GLONASS signals. This single difference step still, however, eliminates differences (offsets) of the satellite clocks from a common time, usually chosen to be GPS time.

A next step 223 uses the C/A code of the received signals to calculate the expected phase quantities of the point B but because of the low resolution provided by such a measurement actually calculates these quantities for a point $B_O$. As shown in FIG. 6, this point has coordinates ($X_{BO}$, $Y_{BO}$, $Z_{BO}$) and is displaced from the actual point B by an increment ($\Delta X_B$, $\Delta Y_B$, $\Delta Z_B$). This is the same as the technique used in GPS relative positioning in order to be able to use and solve linear equations in subsequent steps.

In a step 225, double differences are calculated in the manner shown in Section 2 of the Appendix for all GPS observables and GLONASS phase observables. The individual satellite signal frequencies and wavelengths are carried in these equations but otherwise is quite similar to difference calculations used with GPS alone. Because of the different GLONASS satellite signal frequencies, terms including differences (offsets) between the receiver clocks and a common GPS time do not drop out of phase observables as they do when only GPS signals are being processed. A term $\Delta \delta_{AB}$ in the equations of the Appendix, represents a collective offset of the two receiver clocks from the common GPS time.

Double differenced carrier phase observables have then been using in a step 227 to search for accidental cycle slips. It is assumed that receiver's feedback loops may accidentally lose tracking of phase. After they get tracking locked again the output phase data undergo a sudden change which typically include an integer number of cycles. So they are commonly called cycle slips. Detection of cycle slips is based on averaging the phase data through the sliding window and comparison of the successive phase data with antecedent averaged data. The post processor takes the cycle slips into account assigning separate phase ambiguity to every "smooth segment" of phase data.

A step 229 forms the set of phase ambiguities $\hat{N}$ to be included into the equation (S) of Section 2 of Appendix.

A linearized model (S) is then constructed, as indicated by a step 231, details of which are given in Section 2 of the Appendix. This step includes estimating the receiver clock offset term $\Delta \delta_{AB}$ by use of the pseudo-range values determined from signal codes and phase values referring to the GLONASS satellites.

The general linear system produced by linear least squares technique should then be solved to get corrections ($\Delta X_B$, $\Delta Y_B$, $\Delta Z_B$) to the receiver B coordinates. Float estimations to the integer ambiguities $\hat{N}$ are obtained incidentally. The sum of squares of the residuals, i.e., a quadratic functional, is used as a metric as a quantity to be minimized, in the embodiment of the present invention being described. This is described mathematically in section 2.2.4 of the Appendix. A metric may be a measure of the deviation of the observations from values corresponding to the estimated position or trajectory. This deviation is commonly referred to as the residuals. An alternative metric is the p-norm of the residuals, where the p-norm is defined as:

$$\|x\|_p = \left( \sum_i |x_i|^p \right)^{1/p}$$

metric is the p-norm of linear combinations of the elements of the residuals, i.e., $\|W\chi\|_p$, where W is a matrix. We shall refer to $\|W\chi\|_p$ as a weighted vector p-norm.

The coordinates ($X_B$, $Y_B$, $X_B$) are then updated as it is shown in the step 233.

The steps 225–233 are repeated until the tolerance specified is achieved. The convergence criterion supposes that the norm of the whole vector ($\Delta X_B(1), \Delta Y_B(1), \Delta Z_B(1)$), ($\Delta X_B(2), \Delta Y_B(2), \Delta Z_B(2)$), . . . (or just ($\Delta X_B, \Delta Y_B, \Delta Z_B$) for static positioning) is less than some prescribed value.

A next step 235 formulates the integer search problem in the manner shown in Section 2 of the Appendix. A step 235 then solves for the integers $\hat{N}$, as shown in Section 2 of the Appendix. This is accomplished for GLONASS signal data as well as GPS signal data.

The integer values $\hat{N}$ are then used to calculate repeatedly the corrections ($\Delta X_B, \Delta Y_B, \Delta Z_B$) to the differential position. The steps 237–241 supposes almost the same arguments as before when considering the steps 225–233. The only difference consists of absence of handling the ambiguities since they are already determined and fixed. The details are given in Section 2 of the Appendix.

Finally, as indicated by a step 243, the desired relative position vector $\underline{b}_{AB}$ is determined, as shown in Section 2 of the Appendix. The same way post-processor handles kinematic, pseudo-kinematic and stop-and-go data. The only distinction is explicit dependence of the vector $\underline{b}_{AB}(t)$ on time in all cases where we operate with trajectories.

It is often desired and an object of this invention to do kinematic real-time relative positioning using combined GPS and GLONASS signals. This is accomplished using the real-time kinematic processor depicted in FIG. 11. A detailed description of the operation of said real-time kinematic processor is given in section 3 of the Appendix.

There are many specific applications of the relative positioning techniques described above, both where the two or more receiver antennas are all held fixed with respect to the earth at two or more respective locations, or when one or more of the receiver antennae is moving with respect to the earth during the measurement. One class of such applications monitors events of the earth, such as the relative movements of continental plates, crustal deformation, plate tectonics and continental drift, by positioning at least two receiver antennae at locations between which relative movement of the earth is to be monitored.

A typical geodynamics application can be used to study relative motions on the surface of the earth. The user can install one or more receiver antennae on one continental plate and install one or more receiver antennae on an adjacent continental plate. The relative change in position can be measured using the positioning techniques described above. Arrays of permanent receiver stations can be used to measure earth crustal deformation, plate tectonics, and continental drift since the tectonic plates of the Earth's outer layers move relative to each other at rates within the range of 1 centimeter per year to 20 centimeters per year. [National Research Council, "The Global Positioning System, A Shared National Asset", National Academy Press, 1995]

The techniques can also be used to monitor another class of applications of the events of natural hazards, such as earthquakes, volcanoes and floods. A natural hazards application can be monitored by installing one or more receiver antennae on one side of an earthquake fault line and install one or more receiver antennae on the adjacent opposite side of the fault line. The changes in position caused by the earthquake may be measured using the positioning techniques described above. In the case of volcanoes receiver antennae are positioned at locations spaced apart across a surface of the volcano to monitor relative movement.

Another class of applications can monitor relative position of a body of water important to the field of oceanography. The position of the body of water can be measured by positioning receiver antennae on one or more buoys floating in an ocean or other body of water and one or more fixed locations on land to measure the relative change in position caused by changes including changes in the water body water level, water currents, or tides.

Another class of applications is in the monitoring of large engineering structures, such as a building, a dam, a bridge or a pipeline. The characteristics of such a structure that can be measured include its position, changes in its position, its geometry and changes in its geometry. The position of the building can be monitored by installing one or more receiver antennae on the building and at least one fixed locations on land to measure the relative change in position caused by variations in the structure due to changes in temperature, snow or water overburden, wind forces, seismic activity, settling, or other forces acting upon or within the structure. The relative change in position can be measured using the positioning techniques described above. Changes in geometry can be determined by measuring more than one location on the structure to determine the relative change in position of the structure. Structures such as dams, bridges, or pipelines can be measured using the positioning techniques described above.

Yet another class of specific applications relates to measuring characteristics of moving objects such as aircraft, water vessels, earth moving vehicles and the like. The measurable characteristics of a vehicle include its position, changes in position, geometry, changes in geometry, orientation and changes in orientation. The position of the moving object can be monitored by installing one or more receiver antennae on the object. Changes in position of the vehicle component relative to other components can be measured by installing at least one receiver antennae at a point on the vehicle and measuring the relative change in position compared to other point(s) on the vehicle. Using three or more points it is also possible to determine the vehicles orientation in three angular dimensions.

Although the present invention has been described with respect to its preferred embodiments, it will be understood that the invention is entitled to protection within the full scope of the appended claims, which appear after the following Appendix.

APPENDIX

1. Notations 1.1 Nomenclature

The units of the following quantities are noted parenthetically. "m" denotes meters; "s" denotes seconds.

ρ range between the satellite and receiver (m),

R pseudorange (m); this value will also be referred to as a code measurement, c light speed in a vacuum (m/s), λ wavelength (m), $f=c/\lambda$ frequency (s$^{-1}$), φ carrier phase measurements (measured in cycles), $N_o$ integer phase ambiguities, ψ heterodyne's initial phase (cycles), subscripts $_{GPS,GLN}$ are to identify GPS or GLONASS channels, δ receiver's or satellite's clock bias (s), $\tau_{ion}$ ionosphere delay (m) that affects the code measurements on first frequency, will be used as scalar and vector as well, $\tau_{trop}$ troposphere delay (m), subscript $_A$ is to index the receiver A, superscript $^j$ is to identify the satellite SV$^j$, (t) denotes dependence on time at time t, subscripts $_{L1,L2}$ are to denote first and second frequency band, prefix Δ denotes first (between receivers) differencing, prefix ∇ denotes second (between receivers and between satellites) differencing, superscript $^T$ (applied to the matrices) denotes matrix transposition, $$x = (\Delta X_B \quad \Delta Y_B \quad \Delta Z_B)^T = \begin{bmatrix} \Delta X_B \\ \Delta Y_B \\ \Delta Z_B \end{bmatrix}$$

of corrections to the rough coordinates $(X_{BO} \ Y_{BO} \ Z_{BO})^T$ of the receiver B; all the vectors are supposed to be columns, $$x = \begin{bmatrix} x \\ \Delta \delta \end{bmatrix}$$

receivers clock biases, $J_{GPS}(t)$ denotes the number of GPS satellites observable at time t, $J_{GLN}(t)$ denotes the number of GLONASS satellites observable at time t, A denotes J(t)×3 first derivatives' matrix (Jacobian matrix) of $\Delta \rho^j_{AB}$ j=1, ... ,J(t), with respect to coordinates at the point $(X_{BO} \ Y_{BO} \ Z_{BO})^T$:

$$A = \begin{bmatrix} -\dfrac{(X^1(t) - X_{BO})}{\rho^1_{BO}} & -\dfrac{(Y^1(t) - Y_{BO})}{\rho^1_{BO}} & -\dfrac{(Z^1(t) - Z_{BO})}{\rho^1_{BO}} \\ \cdots & \cdots & \cdots \\ -\dfrac{(X^{J(t)}(t) - X_{BO})}{\rho^{J(t)}_{BO}} & -\dfrac{(Y^{J(t)}(t) - Y_{BO})}{\rho^{J(t)}_{BO}} & -\dfrac{(Z^{J(t)}(t) - Z_{BO})}{\rho^{J(t)}_{BO}} \end{bmatrix},$$

Let also introduce following J(t)×4 matrices, $$\underline{A} = \begin{bmatrix} & -c \\ A & \vdots \\ & -c \end{bmatrix},$$

I identity square matrix of appropriate dimension, $\overline{N} = \Delta N_o + \Delta \psi$ float first difference ambiguities, $\Lambda = \mathrm{diag}(\lambda^1 \ldots \lambda^{J(t)})$ diagonal matrix of GLONASS wavelengths for L1 or L2 band, in all cases where it does not lead to misunderstanding, the vector ι (adjusted with correspondent indices and prefixes) denotes the right hand side of any linearized equation.

1.2 Basic Measurement Equations

The GPS measurement model written in above notations take the following form $$R_{A,L1}^j(t) = \rho_{A,L1}^j(t) + c(\delta^j - \delta_A) + \tau_{trop,A}^j(t) + \tau_{ion,A}^j(t) + n_{A,L1}^j(t)$$

$$R_{A,L2}^j(t) = \rho_{A,L2}^j(t) + c(\delta^j - \delta_A) + \tau_{trop,A}^j(t) + \left(\frac{\lambda_{L2}}{\lambda_{L1}}\right)^2 \tau_{ion,A}^j(t) + n_{A,L2}^j(t)$$

$$\phi_{A,L1}^j(t) = \rho_{A,L1}^j(t)/\lambda_{L1} + f_{L1}(\delta^j - \delta_A) + \tau_{trop,A}^j(t)/\lambda_{L1} - \tau_{ion,A}^j(t)/\lambda_{L1} + N_{o,GPS,L1}^j + \psi_{GPS,A,L1} + v_{A,L1}^j(t)$$

$$\phi_{A,L2}^j(t) = \rho_{A,L2}^j(t)/\lambda_{L2} + f_{L2}(\delta^j - \delta_A) + \tau_{trop,A}^j(t)/\lambda_{L2} - \frac{\lambda_{L2}}{(\lambda_{L1})^2} \tau_{ion,A}^j(t) + N_{o,GPS,L2}^j + \psi_{GPS,A,L2} + v_{A,L2}^j(t)$$

The unstructured noises n,v which affect the measurements all are supposed to be white, independent of each other and $(0,\sigma^2)$-distributed.

The GLONASS measurement model take the same form. The only distinguish is dependency of frequencies and wavelengths on satellite's index $^j$ $$R_{A,L1}^j(t) = \rho_{A,L1}^j(t) + c(\delta^j - \delta_A) + \tau_{trop,A}^j(t) + \tau_{ion,A}^j(t) + n_{A,L1}^j(t)$$

$$R_{A,L2}^j(t) = \rho_{A,L2}^j(t) + c(\delta^j - \delta_A) + \tau_{trop,A}^j(t) + \left(\frac{\lambda_{L2}^j}{\lambda_{L1}^j}\right)^2 \tau_{ion,A}^j(t) + n_{A,L2}^j(t)$$

$$\phi_{A,L1}^j(t) = \rho_{A,L1}^j(t)/\lambda_{L1}^j + f_{L1}^j(\delta^j - \delta_A) + \tau_{trop,A}^j(t)/\lambda_{L1}^j - \tau_{ion,A}^j(t)/\lambda_{L1}^j + N_{o,GPS,L1}^j + \psi_{GPS,A,L1} + v_{A,L1}^j(t)$$

$$\phi_{A,L2}^j(t) = \rho_{A,L2}^j(t)/\lambda_{L2}^j + f_{L2}^j(\delta^j - \delta_A) + \tau_{trop,A}^j(t)/\lambda_{L2}^j - \frac{\lambda_{L2}^j}{(\lambda_{L1}^j)^2} \tau_{ion,A}^j(t) + N_{o,GPS,L2}^j + \psi_{GPS,A,L2} + v_{A,L2}^j(t)$$

constructions.

1.3 Linearized First Differences Equations

Here and after troposphere delays $\tau_{trop}$ are taken into account by direct calculations and they are included into the right hand sides of linearized measurements equations. The ionosphere delays are supposed to be evaluated and so appears in the equations in the explicit form.

The GPS first differences equations take the following form:

$$A(t)x(t) + \Delta\tau_{ion}(t) = l_{L1,code}(t)$$

$$A(t)x(t) + \left(\frac{\lambda_{L2}}{\lambda_{L1}}\right)^2 \Delta\tau_{ion}(t) = l_{L2,code(t)}$$

$$\frac{1}{\lambda_{L1}}A(t)x(t) - \frac{1}{\lambda_{L1}}\Delta\tau_{ion}(t) + \overline{N}_{GPS,L1} = l_{L1,phase}(t)$$

$$\frac{1}{\lambda_{L2}}A(t)x(t) - \frac{\lambda_{L2}}{(\lambda_{L1})^2}\Delta\tau_{ion}(t) + \overline{N}_{GPS,L2} = l_{L2,phase}(t)$$

The GLONASS first differences equations take the following form:

$$A(t)x(t) + \Delta\tau_{ion}(t) = l_{L1,code}(t)$$

$$\underline{A}(t)\underline{x}(t) + (\Lambda_{L2}\Lambda_{L1}^{-1})^2 \Delta\tau_{ion}(t) = l_{L2,code}(t)$$

$$\Lambda_{L1}^{-1}A(t)x(t) - \Lambda_{L1}^{-1}\Delta\tau_{ion}(t) + \overline{N}_{GLN,L1} = l_{L1,phase}(t)$$

$$\Lambda_{L2}^{-1}A(t)x(t) - \Lambda_{L2}\Lambda_{L1}^{-2}\Delta\tau_{ion}(t) + \overline{N}_{GLN,L2} = l_{L2,phase}(t)$$

2. Post-Processing

2.1. Introduction

In this section, the general processing approach described on the FIG. 7 is detailed. We deal with the problem of precise differential static, pseudo-static, and kinematic positioning based on the GPS and GLONASS measurements acceptable from single and double band receivers.

A unified approach for solving positioning problems in static, pseudo-static, and kinematic settings is presented. All of these problems are handled by the same numerical scheme and the same software.

2.2 Problem Statement

The approach proposed is based on the usage of common least squares technique to take into account the measurement equations, the dynamic system equations and the residual ionosphere delay model as well. The common sum of squares, or quadratic functional, can be thought of as norm of deviation of estimated position or trajectory from one compatible with observations. This norm is to be minimized. Processing of the kinematic measurements follows the same scheme as processing of the static and pseudo static measurements does. The only difference is in the dimensions and structure of the corresponding matrices.

2.2.1 Measurement

The measurements' model includes:

Double difference pseudorange GPS observables,
Double difference phase GPS observables,
Single difference pseudorange GLONASS observables,
Double difference phase GLONASS observables, as it is pointed out in Steps 225 and 237 in the FIG. 7.

It is supposed that the reference satellite is chosen for every system at every epoch.

The following notations will be introduced in this section to use along with general notations of the section 1:

r(t) is the index of reference satellite at time t,

D(t) denotes J(t)×3 first derivatives' matrix (Jacobian matrix) of $\nabla\Delta\rho_{AB}^j(t) = \Delta\rho_{AB}^j(t) - \Delta\rho_{AB}^{r(t)}(t), j=1, \ldots, J(t)$, with respect to coordinates at the point $(X_{BO}\ Y_{BO}\ Z_{BO})^T$:

$$D(t) = A(t) + \begin{bmatrix} \frac{(X^{r(t)}(t) - X_{BO}(t))}{\rho_{BO}^{r(t)}(t)} & \frac{(Y^{r(t)}(t) - Y_{BO}(t))}{\rho_{BO}^{r(t)}(t)} & \frac{(Z^{r(t)}(t) - Z_{BO}(t))}{\rho_{BO}^{r(t)}(t)} \\ \cdots & \cdots & \cdots \\ \frac{(X^{r(t)}(t) - X_{BO}(t))}{\rho_{BO}^{r(t)}(t)} & \frac{(Y^{r(t)}(t) - Y_{BO}(t))}{\rho_{BO}^{r(t)}(t)} & \frac{(Z^{r(t)}(t) - Z_{BO}(t))}{\rho_{BO}^{r(t)}(t)} \end{bmatrix};$$

its r(t)-th string is zero.

$N = \Delta N_o$ integer component of real phase single difference ambiguities (see Appendix, Section 1), $\hat{N} = (N_{1,GPS}^T, N_{2,GPS}^T, N_{1,GLN}^T, N_{2,GLN}^T)^T$, q=dim($\hat{N}$), $y(t) = \Delta\tau_{ion}(t)$ the vector of single difference ionosphere delays (in meters) that affects the code measurements on first frequency,

```
E(t) = I - 1 × e^T_r(t),  where 1 = (1,  , 1)^T, i
              ↓
e_i = (0,  , 0, 1,  , 0)^T, ∇f = (f_1,GLN - f_r(t),GLN,  , f_J(t),GLN - f_r(t),GLN)^T
```

Note, that: ■ $\Delta\delta_{AB}(t)$ will be neglected from GPS measurements and double differencing, ■ one of $y_{i,GPS}(t)$ should be set to zero under double difference processing, ■ one of $N_{i,GPS,L1}$ one of $N_{i,GPS,L2}$, one of $N_{i,GLN,L1}$, and one of $N_{i,GLN,L2}$, should be set to zero under double difference processing.

With these notations taken in account the linearized measurements' equation (discussed in the description of Steps 231 and 239 of FIG. 7) takes the following form:

$$D(t)x(t) + E(t)y_{GPS}(t) = l'_{L1,code}(t)$$

$$D(t)x(t) + \left(\frac{\lambda_{L2}}{\lambda_{L1}}\right)^2 E(t)y_{GPS}(t) = l'_{L2,code}(t)$$

$$\frac{1}{\lambda_{L1}}D(t)x(t) - \frac{1}{\lambda_{L1}}E(t)y_{GPS}(t) + H_{GPS,L1}(t)N_{GPS,L1} = l'_{L1,phase}(t)$$

$$\frac{1}{\lambda_{L2}}D(t)\underline{x}(t) - \frac{\lambda_{L2}}{(\lambda_{L1})^2}E(t)y_{GPS}(t) + H_{GPS,L2}(t)N_{GPS,L2} = l'_{L1,phase}(t)$$

$$A(t)x(t) - 1 \times c\Delta\delta_{AB}(t) + y_{GLN}(t) = l_{L1,code}(t)$$

$$A(t)x(t) - 1 \times c\Delta\delta_{AB}(t) + (\lambda_{L2}\lambda_{L1}^{-1})^2 y_{GLN}(t) = l_{L2,code}(t)$$

$$\lambda_{L1}^{-1}D(t)x(t) - \nabla f \Delta\delta_{AB}(t) -$$
$$\lambda_{L1}^{-1}y_{GLN}(t) + H(t)_{GLN,L1}N_{GLN,L1} = l'_{L1,phase}(t)$$

$$\lambda_{L2}^{-1}D(t)x(t) - \nabla f \Delta\delta_{AB}(t) - \lambda_{L2}\lambda_{L1}^{-2}y_{GLN}(t) + H(t)_{GLN,L2}N_{GLN,L2} =$$
$$l'_{L2,phase}(t)$$

The matrices H(t) consists of +1, −1, and 0 and shows which ambiguities should be "dispatched" to every phase measurement (see description of Steps 227, 229).

The above system may be rewritten with obvious notations (which follow immediately from the formulation of the above system) in the following form:

$$S(t)\chi(t) - C(t)\delta_{AB}(t) + G(t)\gamma(t) + H(t)\hat{N} = \iota(t), \quad (S)$$

where $\hat{N} = (N_{1,GPS}^T, N_{2,GPS}^T, N_{1,GLN}^T, N_{2,GLN}^T)^T$.

Note: for static positioning problems the following identity $$\chi(t) \equiv \chi$$

obviously holds.

2.2.2 Rover's Motion

The rover's motion is described by simplified model which is a first order Gaussian-Markov stochastic process with respect to velocities. Its discrete version is $$b_{AB}(t+2) - (1+\gamma_r)b_{AB}(t+1) + \gamma_r b_{AB}(t) = n_r^{(k)}$$

$$\gamma_r = \exp\left(-\frac{\tau_e}{\tau_r}\right),$$

where $\tau_e$ is a between-epoch time, $1/\tau_r$ reflects inertial and dissipative properties of the moving object, $n_r$ is a three-dimensional white noise which can be thought as an uncertain force.

2.2.3 Ionosphere Delay Modelling

The residual single difference ionosphere delays $\gamma(t)$ are modeled for each satellite as a first order Gaussian-Markov process $$y(t+1) - \gamma_I y(t) = n_I(t) \quad \gamma_I = \exp\left(-\frac{\tau_e}{\tau_I}\right),$$

where $n_I$ is a vector of independent white noises with variances $\sigma_I^2 = r\|b_{AB}\|(1-\gamma_I^2)10^{-6}$, where $\|b_{AB}\|$ is the base line length, $r \in (1,5)$ is a parameter to be adjusted.

2.2.4 General Least Squares Problem

All the measurements and dynamic models for rover motion and ionosphere delays are gathered together to form common quadratic functional to be minimized:

$$\Phi = \sum_t \left[ (S(t)x(t) - C(t)\delta_{AB}(t) + G(t)y(t) + H(t)\hat{N} - \right. \quad (M)$$

$$(l))^T P_m \times (S(t)x(t) - C(t)\delta_{AB} + G(t)y(t) +$$

$$H(t)\hat{N} - l(t)) + (x(t+1) - (1+\gamma_r)x(t+1) +$$

$$\gamma_r x(t))^T P_r (x(t+1) - (1+\gamma_r)x(t+1) + \gamma_r x(t)) +$$

$$\left. (y(t+1) - \gamma_I y(t))^T P_I (y(t+1) - \gamma_I y(t)) \right] \rightarrow$$

$$\min_{x(t) \in R^3, \delta_{AB}(t) \in R, y(t) \in R^{J(t)}, N \in Z^q}$$

where the weighting matrices P are inverse of correspondent covariance matrices, R is the real Euclidean normed space of appropriate dimension, $Z^q$ is an integer q-dimensional lattice.

The problem ($M_{Float}$) will be considered along with the problem (M). ($M_{Float}$) differs from (M) by the only condition $\hat{N} \in Z^q$ substituted with condition $\hat{N} \in R^q$.

2.3 Numerical Scheme

The general numerical scheme consists of three stages:

Float solution stage. Iterative solution to the problem ($M_{Float}$). Let the subscription $_{Float}$ be used to denote float (in other words, real) minimizers to the functional Φ when the problem ($M_{Float}$) is solved (see description of Steps 225–233 in the FIG. 7).

The subscript $_{Fixed}$ will be used to denote the solution to the initial problem (M).

Ambiguity resolution in order to determine fixed minimizer $\hat{N}_{Fixed}$ based on the float one $\hat{N}_{Float}$ which is at hands after first stage, Fixed solution stage. All the rest components of the solution to the problem (M) are to be determined: $x_{Fixed}(t)$, $\Delta\delta_{AB,Fixed}(t)$, $y_{Fixed}(t)$. Iterative solution to this problem forms Steps 225–233 in the FIG. 7.

2.3.1 General Numerical Scheme

The Gauss-Newton iterations are used to minimize the functional under the first and third stages. Starting with initial rough approximation they produce sequential corrections to the current approximation until precise one (up to a tolerance specified) is obtained. Each iteration is based on linearized measurements (S). First of all, it is easy to see that $\Delta\delta_{AB}(t)$ may be easily found as conditional minimizer to the functional as $$\Delta\delta_{AB}(t) = \frac{1}{C(t)^T P_m C(t)} C(t)^T P_M \big(S(t)x(t) + G(t)y(t) + H(t)\hat{N} - l(t)\big).$$

After substitution above statement into the functional formulation (M) we arrive at the equivalent formulation of the problem (M):

$$\Phi = \sum_t \Big[\big(S(t)x(t) - G(t)y(t) + H(t)\hat{N} - \quad\quad\quad (M')$$
$$l(t)\big)^T \Big(P_m - \frac{1}{C(t)^T P_m C(t)} P_m C(t) C(t)^T P_m\Big) \times$$
$$\big(S(t)x(t) + G(t)y(t) + H(t)\hat{N} - l(t)\big) + (x(t+1) -$$
$$(1+\gamma_r)x(t+1) + \gamma_r x(t))^T P_r(x(t+1) - (1+\gamma_r)x(t+1) +$$
$$\gamma_r x(t)) + (y(t+1) - \gamma_l y(t))^T P_l(y(t+1) - \gamma_l y(t))\Big] \to$$
$$\min_{x(t)\in R^3, \delta_{AB}(t)\in R, y(t)\in R^{J(t)}, N\in Z^q}$$

The following point is very essential. How can we solve the problem (M) after they are formulated. First of all, it is easily seen that the overall number of the variables to be determined is very large general case. Their number is typically several tens of thousands when processing kinematic and mixed static and kinematic data. On the other hand, there are a lot of zeros in the matrix of the quadratic function to be minimized. Almost all the entries are zero. Consequently, to solve the problem (M) we should handle large scale special pattern sparse matrices. We omit awkward technical details (that contain nothing but trivial matrix multiplying and summing) and discuss only the pattern that form nonzero entries. The matrix of the quadratic part of the problem (M) is positive definite, symmetric and has dimensions d×d. Let denote it by Q. Let also ι be the d-dimensional vector of the linear part of the problem (M). Then the solution to the problem (M) satisfies the linear system $$QV = -R, \quad\quad\quad\quad (LS)$$

where $V = \text{col}(\gamma(1),\chi(1),\gamma(2),\chi(2),\ldots,\hat{N})$ in the more general case.

The analysis of the problem (M) shows that the matrix Q takes the band-wise structure with spikes. It can be stored only in the packed form. Consequently, only those techniques for solution to the problem (M) are of the interest, that don't enlarge the amount of memory to store the matrix. It is well known that inverse of sparse matrix is dense in general. Consequently, direct approach for solution of the system (LS) by inverse of the matrix Q is of no interest. On the other hand, it is well known also that various matrix factorizations preserve this special pattern. We use Cholesky factorization that is just of such kind:

$$Q = LL^T. \quad\quad\quad\quad (LL)$$

To store Cholesky factor L one needs just the same memory as for storage the lower diagonal part of the matrix Q. It should be noted that each string to be stored encounters all the entries from a diagonal till the more left nonzero entry in the lower diagonal part of Q. To solve the system (LS) one needs now just the forward and backward runs:

$$LZ = -R, \quad L^T V = Z$$

Let as consider all the possible special cases of the pattern of Q and the general case as well. In all cases where it doesn't lead to misunderstanding we shall use the obvious notations without comments.

2.3.2 Static Processing.

In the case when ionosphere delays are not modelled the variables $\gamma(t)$ are neglected and variables' vector takes the simplest form to $V = \text{col}(\chi,\hat{N})$. In this case $d = 3 + q_o$ and the matrix Q is low dimension dense matrix.

In the case when ionosphere delays are taken into account we have $V = \text{col}(\gamma(1),\gamma(2),\gamma(3),\ldots,\chi,\hat{N})$ and the pattern of the matrix Q takes the band-wise form shown on the FIG. 8.

2.3.3 Kinematic Processing.

In this case we have $V = \text{col}(\gamma(1),\chi(1),\gamma(2),\chi(2),\gamma(3),\chi(3),\ldots,\hat{N})$ and the pattern of the matrix Q takes the band-wise form shown on the FIG. 9.

2.3.4 Pseudo-Static and Stop-and-Go Processing.

The pattern of the matrix Q takes the form shown on the figure FIG. 10.

2.3.5 Ambiguity Resolution.

Consider now the problem of fixing the ambiguities. To fix the ambiguities we follow the scheme minimizing certain quadratic form over the integer lattice. Let the vector V be represented in the following form $$Y = \begin{pmatrix} v \\ \hat{N} \end{pmatrix}, v \in R^{d-q}, \hat{N} \in R^q,$$

where v consists of $\gamma(t)$ and $\chi(t)$. Let also $$V_{Float} = \begin{pmatrix} v_{Float} \\ \hat{N}_{Float} \end{pmatrix}$$

be the float minimizer of the functional (the last iteration solution to ($M_{Float}$)) while $$V_{Fixed} = \begin{pmatrix} v_{Fixed} \\ \hat{N}_{Fixed} \end{pmatrix}$$

be the solution to the problem ($M_{Fixed}$). In other words, $$V_{Fixed} = \begin{pmatrix} v_{Fixed} \\ \hat{N}_{Fixed} \end{pmatrix}$$

is a minimizer of the functional $\Phi$ over $v \in R^{d-q}$ and integer $\hat{N} \in Z^q$. The matrix Q at the point $V_{Float}$ can be represented in the form $$Q = \begin{bmatrix} Q_{11} & Q_{12} \\ Q_{12}^T & Q_{22} \end{bmatrix}, Q_{11} \in R^{(d-q)\times(d-q)},$$
$$Q_{12} \in R^{(d-q)\times q}, Q_{22} \in R^{q\times q}$$

To find $V_{Fixed}$ we first find $\hat{N}_{Fixed}$ as a solution to the following problem (Step 235, FIG. 7):

$$(\hat{N} - \hat{N}_{Fixed})^T (Q_{22} - Q_{12}^T Q_{11}^{-1} Q_{12})(\hat{N} - \hat{N}_{Fixed}) \to \min_{\hat{N}\in Z^q}$$

One of the ambiguities among $N_{i,GPS,L1}$, one of $N_{i,GPS,L2}$, one of $N_{i,GLN,L1}$, and one of $N_{i,GLN,L2}$, should be set to zero when solving the above problem. Then we perform Gauss-Newton iterations ($M_{Fixed}$) with respect to v for fixed $\hat{N}_{Fixed}$.

Note: It may be proved using simple algebra, that Cholesky factorization of the matrix $D=(Q_{22}-Q_{12}{}^T Q_{11}{}^{-1} Q_{12})$ is just the lower right block of the matrix L from (LL).

There are various approaches to solve quadratic integer programming problem (QIPP). We follow branch-and-bounds approach which is based on the sequential relaxing the integer-valued condition.

3. Efficient Real Time Kinematic Processing

3.1 Introduction

When post-processing previously collected data files, the time available for data processing is not, in general, limited. In trying to perform real time positioning, there are 3 main problems:

The computational resources may be limited;

Base data may arrive to rover (say, through radio link) with irregular drops, because of fading, jamming etc. and with some delay (latency);

Code and carrier data must be processed in real time, so baseline estimate must be updated each time new rover measurements are available. No large latency in output estimates is allowed.

These features motivate us to pay careful attention to numerical efficiency and robustness of real-time processing.

3.2 Problem Statement

Most of GPS real-time kinematic engines are based on standard double difference techniques employing the general Kalman filter concept. To accommodate GLONASS data in flexible and numerically efficient way, a simplified real-time kinematic algorithm is employed. The key differences are:

the use of Singe Difference (SD) observation versus the usual Double Difference (DD) observations;

the lack of a dynamic model for the variable parameters;

the effective ambiguity search and fixing procedure.

We now consider these differences in detail.

3.2.1 Single Difference Versus Double Difference Processing

Standard DD techniques compensate for between-receiver clock bias and other unknowns for GPS only processing. Since GLONASS has different carrier frequencies, standard double difference processing does not cancel clock bias. Instead, we may process combined single difference data and estimate between clock bias and its rate. It gives a number of advantages, including:

diagonal measurement noise covariance;

absence problems with reference satellite;

Also we preliminary scale GLONASS carriers to GPS wavelength which allows to consider GLONASS as the simplest extension of GPS for the most of engine subroutines.

The engine loop then tracks whole scaled SD carrier bias vector, rather than DD ambiguity. This vector is not integer by definition. It may not be fixed in principle. However, some combinations of its states should be fixable. So before calling integer search we must perform some transformations with original tracked vector. These transformations may be different for receivers with different frequency plans and for different modes of real time kinematic processing (first fix, re-fix after short loss of lock, turned on/off hardware bias calibration etc.). The engine absorbs all these options in very easy way. The most common example of such a transformation is the following. We simply convert scaled SD carrier bias vector of a size J1+J2 to fixable DD carrier bias vector of a size J1-1+J2-1 (1 stands for GPS, 2 for GLONASS). In other words, we try to fix only GPS-GPS and GLONASS-GLONASS SD biases. After fixing DD ambiguity we return to original scaled SD space and engine continue tracking.

3.2.2 Absence of Dynamic Model

Since a dynamic model for the time variable parameters is not used, generalized Kalman filter equations become very compact. As a result, we track only scaled SD carrier bias vector (constant in time) and the actual dimension of the filter is reduced by 8 states (3 dimensional position & clock and their derivatives). We finally get very flexible engine with much saved computations and memory.

The lack of a dynamic model causes a minimal and acceptable loss in performance and insures increased robustness against outliers in rover dynamic.

3.2.3 Effective Ambiguity Search and Fixing:

The speed and reliability of ambiguity resolution depends basically on the number of carriers simultaneously involved into integer search procedure. However, standard search routines (say, those ones which propose to separate search space into primary and secondary subspaces) take a lot of time to find the best candidates over the integer grid of high dimension (more than 10). On the other hand, we want to call (and do call) the search each data epoch to get as fast as possible ambiguity resolution. So we have developed very effective integer search algorithm which includes:

appropriate transformation of original integer grid;

integer search itself over the new space with regularly reduced search bounds;

inverse transformation to return to original integer grid.

Preliminary transformation of original integer grid is the vital part of whole search algorithm, since original search matrix is usually very close to singular (condition number may be up to $10^{6-7}$). Transformed integer grid allows to perform the search with almost 'spherical' search matrix (condition number within about 1 ... 10), so the search itself is performed in very fast way. Also, elliptic search bound is reduced each time new integer has been found. The algorithm may search for extended number of the best integers (up to 100).

To fix DD integer ambiguity we use guaranteed decision rule which insures as fast as possible ambiguity resolution with wrong fix probability always below some a priori guaranteed value we specify.

Once some ambiguity has been fixed the engine may not track it until cycle slips detected. Nevertheless we continue tracking fixed ambiguities. It is somehow useless for GPS, however may be very important for GLONASS. After fix we reduce considerably formal variances of GPS ambiguities (up to, say $10^{-7}$ square cycles), but not reduce (or reduce in considerably less degree) those for GLONASS. Then we get very useful possibility to filter automatically GLONASS hardware carrier biases to:

reduce position error;

calibrate in background GLONASS hardware biases in order to cancel for them at next sessions or after short loss of lock.

3.4 Separated Filter Organization

Absence of dynamic model for varied parameters have finally led to the algorithm realized as separated position/velocity/bias filter with built-in 'input guard'. Such a filter does not require any extra processor: it may be realized on the same standard digital signal processor (for example a 33 MHz TMS320C31) used for receiver channel algorithms.

The Separated Filter configuration is briefly showed in FIG. 11. Below is short explanation assuming L1 only code and carrier data processing.

SD code outliers detector checks input SD code measurements (SD code prefit residuals) against outliers. If outliers are detected, then it tries to isolate them. Isolated SVs are dropped out of further epoch processing. Along with detection and isolation it estimates code differential position (meter accuracy) which may be used to control filter divergence. The most of the computations are used then in subengines to be followed.

SD carrier cycle slip detector checks input SD carrier integrated Doppler (between consecutive epochs) against carrier cycle slips. Up to half a cycle slip may be detected. If cycle slips are detected, then it tries to isolated them. Isolated carriers are included into processing as new ones. It uses the most of the computations already performed by SD code outliers detector. Along with cycle slip detection it estimates integrated. (between consecutive epochs) rover velocity to be smoothed then in velocity filter.

Velocity filter smoothes integral velocity estimate from SD carrier cycle slip detector by the simplest first order filter. Velocity estimate is used to project position ahead for time tagged as well as for fast RTK mode.

Base carrier filter smoothes base carriers by 3rd order filter of Kalman-like form (no off line loop; with preliminary tuned coefficients). Optionally it may smooth base carrier corrections by 3rd order filter for GPS and 2nd order for GLONASS. Along with smoothing it also is able to detect and isolate cycle slips in base carrier. Such filters are needed to predict base carrier ahead to implement fast RTK mode.

SD carrier bias filter is the heart of the engine. It tracks whole SD carrier bias assuming it to be constant till SD cycle slip be detected and isolated. The most of the computations for bias filter are already done in the body of SD code outliers detector. SD bias estimate is used for DD ambiguity search routine and position filter.

Search and fixing routine first performs SD/DD carrier bias transformation to get 'fixable' carrier bias combinations. Output search statistic must be then checked for confidence. DD ambiguity fixing occurs if a contrast criterion holds. In case of fixing search matrix is transformed. Then DD/SD transformation is applied to return to SD space.

Position filter estimates current time tagged position by SD carrier measurements with SD carrier bias estimate substituted.

Project ahead is standard, assuming velocity and SD carrier bias to be constant.

Fast RTK subengine does the same position filter does but with base carrier (or base carrier correction) predicted to given epoch.

3.5 Separated Filter Equations

We consider here the case of L1 code and carrier observations only and short baseline (up to about 10 km) where it is possible to neglect SD ionosphere and troposphere delays.

3.5.1 Simplified Measurement Model

Then in correspondence with notations of Appendix 1, the sampled SD measurement model may be presented as:

$$\Delta R_k^j = \Delta \rho_k^j - c \cdot \Delta \delta_k + \Delta n_k^j,$$

$$\Delta \phi_k^j = 1/\lambda^j \cdot (\Delta \rho_k^j - c \cdot \Delta \delta_k) + \Delta N^j + \Delta \psi_{GPS/GLN} + \Delta v_k^j$$

where we omit $_{L1}$ subscript, since consider L1 band only. Values $\lambda^j$ are different for different GLONASS carriers, but the same (simply $\lambda$) for all GPS carriers. Value $\Delta \psi$ is generally different for GPS and GLONASS constellation. Subscript k=1,2, . . . stands for epoch time $t_k$.

First of all we scale carrier observations by value $\alpha^j = \lambda^j/\lambda$ ($\alpha^j = 1$ for GPS carriers):

$$\alpha^j \cdot \Delta \phi_k^j = 1/\lambda \cdot (\Delta \rho_k^j - c \cdot \Delta \delta_k) + \alpha^j \cdot (\Delta N^j + \Delta \psi_{GPS/GLN} + \Delta v_k^j)$$

3.5.2 Linearized Kalman-Like Model

Let state vector (of a size 8+J) be portioned as $X = [x^T \ v^T \ M^T]^T$, where $x = [\Delta x \ \Delta y \ \Delta z \ \Delta \delta]^T$ is 3D baseline coordinates+delta clock, v=x is 3D rover velocity coordinates+delta clock rate, $M = [M^1 \ M^2 \ \ldots \ M^J]^T$, $M^j = \alpha^j \cdot (\Delta N^j + \Delta \psi_{GPS/GLN})$ is scaled SD carrier bias vector. Then Kalman-like linearized measurement model may be portioned as:

$$z_k = \begin{bmatrix} z_k^R \\ z_k^\phi \end{bmatrix} = \begin{bmatrix} h_k & 0 \\ \frac{h_k}{\lambda} & I \end{bmatrix} \cdot \begin{bmatrix} x_k - \hat{x}_k^- \\ M - \hat{M}_k^- \end{bmatrix} + \begin{bmatrix} n_k^R \\ n_k^\phi \end{bmatrix},$$

$$R_k = \begin{bmatrix} d^R r_k & 0 \\ 0 & d^\phi r_k \end{bmatrix}, r_k = \text{diag}(r_k^1, r_k^1, \ldots, r_k^J),$$

where superscript R refers to SD code vector, superscript $\phi$ refers to scaled SD carrier vector. The left hand vector includes SD code and scaled SD carrier prefit residuals. I and 0 mean identity and zero J by J matrices, h means J by 4 3D position and clock design matrix, R means whole measurements covariance matrix (2J by 2J). Parameters $d^R$, $d^\phi$ correspond a priori expected overall SD code and carrier noise variances. Symbol "^" stands for estimate, superscript "-" for project value.

Since we do not apply any dynamic model for time varied parameters we assume vector M to be constant with time, vector v to be arbitrary with time.

3.5.2.1 Precomputations

Some vital computations are common for all the engine subroutines. They are:

$$\beta = d^R \cdot (d^R + \lambda^2 \cdot d^\phi)^{-1} < 1, \ w_k = r_k^{-1}, \ b_k = (h_k^T w_k h_k)^{-1} h_k^T w_k, \ a_k = w_k h_k b_k.$$

3.5.2.2 Kalman-Like Loop

Scaled SD carrier bias filter computes:

$$A_k = -\frac{\lambda}{d^R} \beta \cdot a_k, \ D_k = \frac{1}{d^\phi}(w_k - \beta \cdot a_k),$$

update inverse SD scaled bias covariance and calculate bias gain:

$$Q_k = Q_{k-1} + D_k, \ K_k = Q_k^{-1} \cdot [A_k D_k].$$

Then scaled SD bias update is performed as follows:

$$d\hat{M}_k = K_k \cdot z_k, \ \hat{M}_k = \hat{M}_k^- + d\hat{M}_k.$$

Position filter simply computes:

$$\hat{x}_k = \hat{x}_k^- + \lambda \cdot b_k \cdot (z_k^\phi - d\hat{M}_k).$$

Velocity filter performs:

$$dz_k^\phi = z_k^\phi - z_{k-1}^\phi + d\hat{M}_{k-1}, \ \tilde{v}_k = 1/dT \cdot \{(\hat{x}_k^- - \hat{x}_{k-1}^-) + \lambda \cdot b_k \cdot dz_k^\phi\}, \ \hat{v}_k = -0.5\hat{v}_k^- + 1.5\tilde{v}_k,$$

where dT is interval between consecutive epochs.

Projecting ahead, we have:

$$\hat{x}_{k+1}^- = \hat{x}_k + \hat{v}_k \cdot dT, \ \hat{v}_{k+1}^- = \hat{v}_k, \ \hat{M}_{k+1}^- = \hat{M}_k.$$

3.6 Outliers and Cycle Slip Detectors

Detectors of SD code outliers and SD carrier cycle slips are based on chi square statistic which may be written as follows:

$$\chi_{code}^2 = (z^P)^T \cdot (w-a) \cdot (z^P).$$

$$\chi_{carr}^2 = (dz^\Phi)^T \cdot (w-a) \cdot (dz^\Phi).$$

3.7 Ambiguity Searching and Fixing

SD/DD carrier bias transformation may-be portioned as:

$$\hat{N} = \begin{bmatrix} \overline{N} \\ \tilde{N} \end{bmatrix} = T_{M/N} \cdot \hat{M},$$

$$S = \begin{bmatrix} \overline{\overline{S}} & \overline{\tilde{S}} \\ \overline{\tilde{S}}^T & \tilde{S} \end{bmatrix} = T_{M/N}^{-T} \cdot Q \cdot T_{M/N}^{-1}.$$

where $T_{M/N}$ is SD/DD square transformation matrix, symbol "–" stands for 'fixable' DD states, "~" for 'not fixable' DD states.

And finally DD integer ambiguity search statistic is:

$$\chi_{amb}^2 = (N - \overline{N})^T \cdot \left( \overline{\overline{S}} - \overline{\tilde{S}} \cdot \tilde{S}^{-1} \cdot \overline{\tilde{S}}^T \right) \cdot (N - \overline{N})$$

It is claimed:

1. A method of determining relative position information of at least two locations, comprising:
   receiving signals at each of said at least two locations over a common time period from a plurality of satellites including at least one GPS satellite and at least one satellite using a non-GPS carrier frequency, and
   processing said received signals from each of said plurality of satellites by a method that includes:
      forming a metric that depends upon values of the relative position information of at least one of said at least two locations and upon carrier phase measurements of the signals received from said plurality of satellites; and
      determining the relative position information of said at least two locations by determining the values of the relative position information that optimizes said metric.

2. The method according to claim 1, wherein:
   forming the metric additionally includes unknown constants proportional to an unknown number of cycles of the carriers of the plurality of received satellite signals, and
   determining the relative position information includes:
      determining values for said unknown constants that optimize said metric, and
      determining values of said relative position information that optimizes said metric with at least one of said unknown constants set to fixed values substantially equal to values of the unknown constants that were previously determined to optimize said metric.

3. The method according to claim 2, wherein said unknown constants are integers.

4. The method according to claim 3, wherein determining values for said unknown integer constants includes:
   forming a plurality of double difference phase relationships of carriers of the signals received from said plurality of satellites that includes terms proportional to a receiver clock offset and of said unknown integer constants, and
   solving said double difference phase relationships for fixed values of the unknown integer constants that optimize said metric.

5. The method according to claim 4, wherein determining values for said unknown integer constants additionally includes:
   forming at least one single difference relationship including pseudorange measurements, and
   estimating terms relating to clock offsets at said at least two locations by using said at least one single difference relationship including pseudorange measurements.

6. The method according to any one of claims 1 through 5, wherein processing said received signals includes establishing a communication link with at least one of said at least two locations.

7. The method according to claim 6, wherein quantities related to at least one of carrier phase measurements, pseudorange measurements and residuals of the signals received from said plurality of satellites at said at least one of said at least two locations are transmitted over the communication link.

8. The method according to claim 6 wherein said communication link is established by use of a data radio transmitter and data radio receiver.

9. The method according to claim 6 wherein said communication link is established by use of a telephone data link.

10. The method according to claim 6 wherein said communication link is established by use of a data cable.

11. The method according to any one of claims 1 through 5, wherein the relative position information that is determined of said at least two locations includes relative fixed positions of said at least two locations.

12. The method according to any one of claims 1 through 5, wherein the relative position information that is determined of said at least two locations includes determining a relative trajectory between said at least two locations.

13. The method according to any one of claims 1 through 5, wherein forming the metric includes calculating a sum of squares of differences between values related to the relative position information and said carrier phase measurements.

14. The method according to any one of claims 1 through 5, wherein determining the relative position information includes optimizing the metric by minimizing said metric.

15. The method according to any one of claims 1 through 5, wherein determining the relative position information includes optimizing the metric by minimizing a vector norm between the calculated and observed quantities.

16. The method according to claim 15, wherein the vector norm is a p-norm, wherein the constant p is greater than or equal to 1.

17. The method according to any one of claims 1 through 5, wherein determining the relative position information includes optimizing the metric by minimizing a quantity related to a vector norm between the calculated and observed quantities.

18. The method according to claim 17, wherein said vector norm is a weighted p-norm.

19. The method according to claim 15, wherein the vector norm is a weighted least squares norm.

20. The method according to any one of claims 1 through 5, wherein determining the relative position information includes optimizing the metric by determining a sum of squares of differences between calculated and observed quantities.

21. The method according to any one of claims 1 through 5, wherein determining the relative position information includes optimizing the metric by maximizing a vector norm between the calculated and observed quantities.

22. The method according to any one of claims 1 through 5, wherein at least one of said at least two locations is fixed with respect to earth.

23. The method according to claim 22, wherein individual antennas of the receivers are positioned at said at least two locations and operate continuously.

24. The method according to any one of claims 1 through 5, wherein at least one of said at least two locations moves with respect to earth.

25. The method according to any one of claims 1 through 5, wherein at least two of said at least two locations moves with respect to each other.

26. The method according to any one of claims 1 through 5, wherein at least one of said carrier phase measurements, pseudorange measurements and residuals of the signals received from said plurality of satellites at said at least one of said at least two locations are transmitted over a communication link to at least one additional location.

27. The method according to any one of claims 1 through 5, wherein said at least two locations includes at least one static location and one kinematic location.

28. The method according to any one of claims 1 through 5, which additionally comprises using the determined relative position information to monitor relative movements of continental plates of the earth.

29. The method according to claim 28, wherein the relative movements being monitored are being caused by at least one of a group of conditions including crustal deformation, plate tectonics, and continental drift.

30. The method according to claim 28, wherein the relative movements are used to monitor at least one of a group of natural hazards including earthquakes, volcanos and floods.

31. The method according to any one of claims 1 through 5, which additionally comprises using the determined relative position information to monitor a body of water on earth.

32. The method according to claim 31 wherein a buoy is collocated on the body of water with said at least one of at least two locations.

33. The method according to claim 31 wherein a tide gauge is collocated on the body of water with said at least one of at least two locations.

34. The method according to any one of claims 1 through 5, wherein said at least one of said at least two locations is located on or about a large engineering structure, and additionally comprising using the relative position information to measure at least one of a group of characteristics including position, changes in position, geometry and changes in geometry of said large engineering structure.

35. The method according to claim 34, wherein said large engineering structure is a dam.

36. The method according to claim 34, wherein said large engineering structure is a bridge.

37. The method according to claim 34, wherein said large engineering structure is a building.

38. The method according to claim 34, wherein said large engineering structure is a pipeline.

39. The method according to any one of claims 1 through 5, wherein said at least one of said at least two locations is located on or about an aircraft, and additionally comprising using the relative position information to measure at least one of a group of characteristics including position, changes in position, geometry, changes in geometry, orientation, and changes in orientation of said aircraft.

40. The method according to any one of claims 1 through 5, wherein said at least one of said at least two locations is located on or about a water vessel, and additionally comprising using the relative position information to measure at least one of a group of characteristics including position, changes in position, geometry, changes in geometry, orientation, and changes in orientation of said water vessel.

41. The method according to any one of claims 1 through 5, wherein said at least one of said at least two locations is located on or about an earth moving vehicle, and additionally comprising using the relative position information to measure at least one of a group of characteristics including position, changes in position, geometry, changes in geometry, orientation, and changes in orientation of said earth moving vehicle.

42. The method according to any one of claims 1 through 5, wherein processing said received signals additionally includes:

choosing a frequency plan of individual receivers positioned at said at least two locations that insures an initial heterodyne carrier bias for a GPS constellation and a non-GPS constellation that is the same, making use of a double difference phase relationship between GPS and non-GPS carriers, and solving said double difference phase relationship for fixed value integers which optimize said metric.

43. A satellite signal receiving system for determining relative position information of at least first and second locations, comprising:

first and second receivers having respective first and second antennas positionable at respective ones of said at least first and second locations, and a signal processor including means responsive to receipt by said receivers of signals from a plurality of satellites over a common time period including at least one GPS satellite and at least one satellite using a non-GPS carrier frequency for forming a metric that depends upon values of the relative position information of at least one of said at least two locations and upon carrier phase measurements of the signals received from said plurality of satellites, and means for determining the values of the relative position information that optimize said metric, thereby to determine the relative position information of said at least two locations.

44. The system of claim 43, wherein said metric forming means additionally includes means for including in the metric unknown constants proportional to an unknown number of cycles of the carriers of the plurality of received satellite signals, and said relative position information determining means includes means for determining values of said unknown constants that optimize said metric, and means for determining values of said relative position information that optimize said metric with at least some of said unknown constants set to fixed values substantially equal to values of the unknown constants determined to optimize said metric.

45. The system of claim 44, wherein said means for including unknown constants in the metric includes means for including integers as said unknown constants.

46. The system of claim 45, wherein said means for determining values of the unknown constants includes means for forming a plurality of double difference phase relationships of carriers of the signals received from said plurality of satellites that includes terms of receiver clock offset and of said unknown constants, and means for solving said double difference phase relationships for fixed values of the unknown constants that optimize said metric.

47. The system of claim 46, wherein said means for determining values of the unknown constants additionally includes means for forming at least one single difference relationship including pseudorange measurements, and means for estimating terms relating to clock offsets at said at least two locations by using said at least one single difference relationship including pseudorange measurements.

48. The system of any one of claims 43–47 wherein at least one of said first and second receivers includes a radio and intermediate frequency section tuned to receive signals within a frequency band of said non-GPS satellite signals, including at least one filter that is characterized by a substantially uniform group delay for all frequencies in its pass band and providing digital data of received said non-GPS signals to said signal processor.

49. The system of claim 48, wherein said at least one of said first and second receivers additionally includes an additional radio and intermediate frequency section tuned to receive signals of GPS satellites, including at least one filter that is characterized by a substantially uniform group delay for all frequencies in its pass band and providing digital data of received GPS signals to said signal processor.

50. A satellite signal receiving system for determining relative position information of at least first and second locations, comprising:
    first and second receivers having respective first and second antennas positionable at respective said first and second locations, each of said receivers including means capable of receiving signals within a frequency band of both GPS satellite and non-GPS satellite signals for providing digital data of received GPS and non-GPS signals, and
    a signal processor receiving the GPS and non-GPS digital data that forms therefrom a plurality of double difference phase relationships of carriers of received GPS and non-GPS signals with terms of clock offsets of the first and second receivers and integer ambiguities, solves said double difference phase relationships for fixed value integers, and determines said relative position information by use of the fixed value integers.

51. The system of claim 50, wherein the signal receiving means of each of said receivers includes at least one filter that is characterized by a substantially uniform group delay for all frequencies in its pass band.

52. A satellite signal receiving system for determining relative position information of at least first and second locations, comprising:
    first and second receivers having respective first and second antennas positionable at respective said first and second locations, each of said receivers including:
        a first section tuned to receive signals within a frequency band of GPS satellite signals and provide digital data of received GPS signals, and
        a second section tuned to receive signals of non-GPS satellites and provide digital data of received non-GPS signals, and
        a signal processor receiving the GPS and non-GPS digital data that forms therefrom a plurality of double difference phase relationships of carriers of received GPS and non-GPS signals with terms of clock offsets of the first and second receivers and integer ambiguities, solves said double difference phase relationships for fixed value integers, and determines said relative position information by use of the fixed value integers.

53. A receiver of positioning system satellite signals, comprising:
    a first section tuned to receive signals within a frequency band of GPS satellite signals and provide digital data of received GPS signals while maintaining a substantially uniform group delay for all of said GPS signals,
    a second section tuned to receive signals of non-GPS satellites and provide digital data of received said non-GPS signals while maintaining said substantially uniform group delay for all of said non-GPS signals, and
    a signal processor receiving the digital data of both of the received GPS and said non-GPS signals for providing data of observables of individual ones of both GPS and said non-GPS signals including carrier phase.

54. The receiver of claim 53, wherein the signal processor providing data of observables of individual ones of both GLONASS and GPS signals includes the processor additionally providing such data of one of pseudorange and carrier frequency.

55. The receiver of either of claims 53 or 54, wherein at least the first section includes at least one filter that is characterized by a substantially uniform group delay for all frequencies in its pass band.

56. The method according to any one of claims 1 through 5 wherein the metric is formed to additionally depend upon code pseudo-range measurements of the signals received from said plurality of satellites.

57. The method according to any one of claims 1 through 5 wherein the metric is formed additionally from both L1 and L2 signals from said plurality of satellites.

58. The method according to any one of claims 1 through 5 wherein receiving signals includes passing signals from the plurality of satellites through at least one filter that is characterized by a substantially uniform group delay for all frequencies in its pass band.

59. The system of any one of claims 43 through 47 wherein the metric is formed to additionally depend upon code pseudo-range measurements of the signals received from said plurality of satellites.

60. The system of any one of claims 43 through 47 wherein the metric is formed additionally from both L1 and L2 signals from said plurality of satellites.

61. A method of determining relative position information of at least two locations, comprising:
    receiving signals at each of said at least two locations over a common time period from a plurality of satellites, wherein at least two of said plurality of satellites utilize distinct carrier frequencies, and
    processing said received signals from each of said plurality of satellites by a method that includes:
        forming a metric that depends upon values of the relative position information of at least one of said at least two locations and upon carrier phase measurements of the signals received from said plurality of satellites, wherein forming the metric includes unknown integer constants proportional to an unknown number of cycles of the carriers of the plurality of received satellite signals; and
        determining the relative position information of said at least two locations by determining the values of the relative position information that optimizes said metric, wherein determining the relative position information includes:
            determining values for said unknown integer constants that optimize said metric, including:

forming a plurality of double difference phase relationships of carriers of the signals received from said plurality of satellites that includes terms proportional to a receiver clock offset and of said unknown integer constants, and solving said double difference phase relationships for fixed values of the unknown integer constants that optimize said metric;

forming at least one single difference relationship including pseudorange measurements, and estimating terms relating to clock offsets at said at least two locations by using said at least one single difference relationship including pseudorange measurements; and determining values of said relative position information that optimizes said metric with at least one of said unknown integer constants set to fixed values substantially equal to values of the unknown integer constants that were previously determined to optimize said metric.

62. The method according to claim 61, wherein processing said received signals includes establishing a communication link with at least one of said at least two locations.

63. The method according to claim 61, wherein the relative position information that is determined of said at least two locations includes determining a relative trajectory between said at least two locations.

64. The method according to claim 61, wherein determining the relative position information includes optimizing the metric by minimizing a vector norm between the calculated and observed quantities.

65. The method according to claim 61, wherein determining the relative position information includes optimizing the metric by minimizing a quantity related to a vector norm between the calculated and observed quantities.

66. The method according to claim 61, wherein determining the relative position information includes optimizing the metric by determining a sum of squares of differences between calculated and observed quantities.

67. The method according to claim 61, wherein determining the relative position information includes optimizing the metric by maximizing a vector norm between the calculated and observed quantities.

68. The method according to claim 61, wherein at least two of said at least two locations moves with respect to each other.

69. The method according to claim 61, wherein said at least two locations includes at least one static location and one kinematic location.

70. The method according to claim 61, wherein said at least one of said at least two locations is located on or about an earth moving vehicle, and additionally comprising using the relative position information to measure at least one of a group of characteristics including position, changes in position, geometry, changes in geometry, orientation, and changes in orientation of said earth moving vehicle.

* * * * *

UNITED STATES PATENT AND TRADEMARK OFFICE
CERTIFICATE OF CORRECTION

PATENT NO.    : 6,229,479 B1
DATED         : May 8, 2001
INVENTOR(S)   : Dmitry Kozlov, Alexander Povaliaev, Lev Rapoport, Stanislav Sila-Novitsky and Vladimir Yefriemov, It is certified that error appears in the above-identified patent and that said Letters Patent is hereby corrected as shown below:

Column 29,
Lines 14 and 15, should read -- including at least on filter that is characterized by an uniform phase delay for all frequencies in its pass --
Lines 22 and 45, should read -- that is characterized by an uniform phase delay --
Line 59, should read -- a signal processor receiving the GLONASS and --

Column 30,
Lines 5 and 6, should read -- received GPS signal while maintaining an uniform phase delay for all said GPS signal, --
Lines 9 and 10, should read -- non-GPS signal while maintaing said uniform phase delay for all of said non-GPS signal, --
Lines 23 and 36, should read -- characterized by an uniform phase delay for all --

Signed and Sealed this

Ninth Day of April, 2002

Attest:

*Attesting Officer*

JAMES E. ROGAN
*Director of the United States Patent and Trademark Office*